US010355297B2

(12) United States Patent
Akagi et al.

(10) Patent No.: US 10,355,297 B2
(45) Date of Patent: Jul. 16, 2019

(54) SOLID OXIDE FUEL CELL APPARATUS

(71) Applicant: TOTO LTD., Kitakyushu-shi, Fukuoka (JP)

(72) Inventors: Yousuke Akagi, Chigasaki (JP); Fumio Tsuboi, Kanagawa (JP); Takeshi Saito, Fujisawa (JP); Takuya Matsuo, Yokohama (JP)

(73) Assignee: TOTO LTD., Fukuoka (JP)

( * ) Notice: Subject to any disclaimer, the term of this patent is extended or adjusted under 35 U.S.C. 154(b) by 995 days.

(21) Appl. No.: 14/835,430

(22) Filed: Aug. 25, 2015

(65) Prior Publication Data

US 2016/0064760 A1     Mar. 3, 2016

(30) Foreign Application Priority Data

Aug. 28, 2014  (JP) .................................. 2014-174203
Aug. 28, 2014  (JP) .................................. 2014-174204
Aug. 28, 2014  (JP) .................................. 2014-174205

(51) Int. Cl.
*H01M 8/06* (2016.01)
*H01M 8/12* (2016.01)
(Continued)

(52) U.S. Cl.
CPC ..... *H01M 8/0618* (2013.01); *H01M 8/04014* (2013.01); *H01M 8/04022* (2013.01); *H01M 8/04067* (2013.01); *H01M 8/04074* (2013.01); *H01M 8/0631* (2013.01); *H01M 8/1246* (2013.01); *H01M 8/2425* (2013.01); *H01M 8/2475* (2013.01); *H01M 2008/1293* (2013.01)

(58) Field of Classification Search
CPC ..... H01M 2008/1293; H01M 8/04014; H01M 8/04022; H01M 8/04067; H01M 8/04074; H01M 8/0618; H01M 8/0631; H01M 8/1246; H01M 8/2425; H01M 8/2475
See application file for complete search history.

(56) References Cited

U.S. PATENT DOCUMENTS

2009/0130533 A1   5/2009  Hirata et al.
2010/0062298 A1   3/2010  Valensa
(Continued)

FOREIGN PATENT DOCUMENTS

CN      101901926 A     12/2010
CN      103579648 A     2/2014

OTHER PUBLICATIONS

Extended Search Report in corresponding European Application No. 15182114.7, dated Oct. 29, 2015, 6 pages.

*Primary Examiner* — Lingwen R Zeng
(74) *Attorney, Agent, or Firm* — Brinks Gilson & Lione

(57) ABSTRACT

A solid oxide fuel cell apparatus 1 has: multiple fuel cell units 16; a module case 8 housing multiple fuel cell units; a heat insulating material 7 disposed to cover the area around the module case 8; a reformer 20 for reforming raw fuel gas using steam, thereby producing fuel gas; a combustion chamber 18 for combusting residual fuel gas and heating the reformer 20; a heat exchanger 23 for exchanging heat between oxidant gas and exhaust gas; and a steam generator 25, disposed within the heat insulating material 7 and on the outside of the module case 8, for exchanging heat between exhaust gas and water immediately after heat is exchanged in the heat exchanger 23, thereby producing steam.

15 Claims, 19 Drawing Sheets

(51) Int. Cl.
*H01M 8/04* (2016.01)
*H01M 8/24* (2016.01)
*H01M 8/0612* (2016.01)
*H01M 8/2475* (2016.01)
*H01M 8/04014* (2016.01)
*H01M 8/04007* (2016.01)
*H01M 8/1246* (2016.01)
*H01M 8/2425* (2016.01)
*H01M 8/124* (2016.01)

(56) References Cited

U.S. PATENT DOCUMENTS

2010/0304245 A1* 12/2010 Tsuchiya ........... H01M 8/04223
    429/423
2011/0053027 A1* 3/2011 Weingaertner .......... F28D 9/005
    429/440
2011/0250513 A1 10/2011 Akikusa
2012/0231360 A1 9/2012 Pastula et al.
2014/0023946 A1 1/2014 Akagi et al.

\* cited by examiner

Flow of Fuel Gas
Flow of Exhaust Gas

SOLID OXIDE FUEL CELL APPARATUS

RELATED APPLICATIONS

This application claims priority under 35 U.S.C. § 119 to Japanese Patent Application Nos. 2014-174203 filed on Aug. 28, 2014, 2014-174204 filed on Aug. 28, 2014 and 2014-174205 filed on Aug. 28, 2014, the entire contents of which are hereby incorporated by reference.

BACKGROUND OF THE INVENTION

1. Field of the Invention

The present invention pertains to a solid oxide fuel cell apparatus, and more particularly to a solid oxide fuel cell apparatus fitted with a steam generator on the outside portion of a module case housing multiple fuel cells.

2. Description of the Related Art

Solid oxide fuel cell apparatuses ("SOFCs" below) are fuel cells which operate at a relatively high temperature in which, using an oxide ion-conducting solid electrolyte as electrolyte, with electrodes attached to both sides thereof, fuel gas is supplied to one side thereof and oxidizer gas (air, oxygen, or the like) is supplied to the other side thereof.

Patent Document 1 (Japanese Unexamined Patent Application Publication No. 2012-221659) sets forth a cell-burner type of solid oxide fuel cell apparatus in which multiple individual fuel cells are disposed in a module case, fuel gas (off gas) remaining without being used for electrical generation is combusted at the top of these multiple individual fuel cells, and a reformer inside the module case is heated by this combustion heat. In particular, in the Patent Document 1 solid oxide fuel cell apparatus, from the standpoint of suppressing the degradation of temperature rise performance relative to the temperature inside the module in the startup step, or temperature unevenness (thermal unevenness) in the fuel cell module caused by the robbing of surrounding heat by a steam generator (vaporizer) for producing steam supplied to a reformer, the steam generator is placed inside the heat insulating material on the outside of the module case.

SUMMARY OF THE INVENTION

Technical Problem

Here, conventionally, exhaust gas resulting from the burning of off-gas has been used to raise the temperature of oxidant gas; specifically, using a heat exchanger, a heat exchange (air-heat exchange) has been conducted between exhaust gas and oxidant gas in the heat exchanger to raise the temperature of the oxidant gas; the operating temperature of a solid oxide fuel cell apparatus at time of startup has been raised by supplying this oxidant gas to a fuel cell. In the solid oxide fuel cell apparatus set forth in the aforementioned Patent Document 1, the heat exchanger is installed on the downstream end side of the steam generator; i.e., exhaust gas is supplied to the heat exchanger after the exchange of heat in the steam generator, and heat is exchanged between this exhaust gas and oxidant gas.

In the Patent Document 1 constitution in which the heat exchanger is placed on the downstream side of the steam generator, however, a large amount of exhaust gas heat is robbed by the steam generator on the upstream side, so that the heat exchange properties (the heat recovery properties) of the heat exchanger on the downstream side are reduced, and an appropriate oxidant gas temperature rise cannot be achieved in the heat exchanger. For this reason, the operating temperature of the solid oxide fuel cell apparatus cannot be quickly raised at startup, etc., and the startup temperature rise is time consuming. Also, trying to speed up the startup temperature rise requires the introduction of large amounts of off-gas for thermal autonomy, leading to tendency to increase the running cost of the solid oxide fuel cell apparatus.

Therefore the present invention has the object of providing a solid oxide fuel cell apparatus with which temperature unevenness in the fuel cell module can be eliminated, temperature at time of startup can be effectively raised by improving heat exchange characteristics in the heat exchanger while assuring steam generating characteristics in the steam generator, and running cost can be reduced (electrical generation efficiency raised) during electrical generation.

Solution to Problem

In order to achieve the above object, the present invention comprises, in a solid oxide fuel cell apparatus for generating electricity by the reaction of fuel gas and oxidant gas: multiple fuel cells mutually connected to one another; a module case housing the multiple fuel cells; a heat insulating material placed to cover the area around the module case; an oxidant gas supply passageway for supplying oxidant gas to the multiple fuel cells; a fuel gas supply passageway for supplying fuel gas to the multiple fuel cells; a reformer, disposed inside the module case, for producing fuel gas by reforming raw fuel gas using steam and supplying the fuel gas to the fuel gas supply passageway; a combustion portion for combusting remaining fuel gas not used for electrical generation by the multiple fuel cells and heating the reformer using the combustion heat; an exhaust passageway through which exhaust gas to be discharged from the module case passes, the surrounding area of which is at least partly covered by the heat insulating material; a heat exchanger to which oxidant gas is supplied, placed relative to the exhaust passageway so that heat is exchanged between the oxidant gas and the exhaust gas transiting the exhaust passageway, the heat exchanger supplying heat-exchanged oxidant gas to the oxidant gas supply passageway, and the surrounding area of the heat exchanger is at least partly covered by the heat insulating material; and a steam generator to which water is supplied, placed relative to the exhaust passageway so that heat is exchanged between the water and the exhaust gas in the exhaust passageway immediately after the heat exchange by the heat exchanger, the steam generator producing steam by vaporizing water through heat exchange and supplying the steam to the reformer, and being disposed on the inside of the heat insulating material and on the outside of the module case.

In the invention thus constituted, the steam generator is placed inside the heat insulating material on the outside of the module case, therefore fuel cell temperature unevenness (heat unevenness) which can occur when a steam generator is placed inside a module case as described above can be eliminated. When the steam generator is placed on the outside of a module case in this manner, the temperature of the exhaust gas inside the module case can be maintained at a higher level when placed on the outside of a module case than when placed inside the module case, therefore the heat exchange characteristics in the heat exchanger can be improved by supplying this higher temperature exhaust gas to the heat exchanger. Hence the present invention is able to provide oxidant gas raised to an appropriate temperature in a heat exchanger to fuel cells, and to quickly raise the temperature at startup in the solid oxide fuel cell apparatus, thereby reducing running cost (raise generating efficiency) at time of startup.

In particular, in the present invention the heat exchanger is placed upstream of the steam generator in the direction of electrical generation flow, and exhaust gas is supplied to the heat exchanger before being heat exchanged in the steam generator, so compared to a configuration in which the heat exchanger is placed downstream of the steam generator (e.g., the configuration set forth in Patent Document 1), a higher temperature exhaust gas can be supplied to the heat exchanger. For this reason, using the present invention the temperature of oxidant gas can be more effectively raised in the heat exchanger and the temperature of the solid oxide fuel cell apparatus can be raised higher at the time of startup. In addition, because of the placement of the steam generator immediately beneath the heat exchanger in the direction of exhaust gas flow, wasted heat exchange between the heat exchanger and the steam generator is not performed, therefore an appropriate steam generating performance can be assured in the steam generator.

Thus using the present invention, a stable oxidant gas temperature rise performance (i.e., system temperature rise performance) and water steam generation performance can be assured, even in the startup step when the exhaust gas temperature is low.

In the present invention, preferably, an exhaust passageway portion through which the exhaust gas passes and which forms part of the exhaust passageway is formed on the bottom layer of the steam generator positioned on the module case side; a steam generating portion for producing steam by vaporizing water and a mixing portion for mixing the steam with raw fuel gas are formed on the top layer of the steam generator positioned on the top portion of the exhaust passageway portion; and the solid oxide fuel cell apparatus further comprises a mixed gas supply pipe which supplies mixed gas of steam and raw fuel gas from the steam generator mixing portion to the reformer, and which extends so as to pass through the exhaust passageway portion of the steam generator.

If the steam generator is placed outside the module case as described above, the temperature of the mixed gas drops during the process by which mixed gas is supplied from the steam generator to the reformer (in such cases there is a possibility that steam will liquefy in the mixed gas), and the temperature of the reformer, can drop, leading to the problem of reduced reforming efficiency, but using the invention constituted as described above, a mixed gas supply pipe for connecting a steam generator on the outside of a module case and a reformer inside the module case is made to pass through the exhaust passageway portion of the steam generator, therefore exhaust gas passing through this exhaust passageway portion flows around part of the mixed gas supply pipe, so the temperature of the mixed gas inside the mixed gas supply pipe can be raised by the exhaust gas. Therefore with the present invention it is possible to supply raised-temperature gas to a reformer, and to resolve problems occurring when a reformer is placed on the outside of the module case as described above. Specifically, temperature drops in the mixed gas supplied from the reformer can be constrained, and in particular the liquefaction of steam in the mixed gas can be constrained, and reforming efficiency the reformer can be secured.

In the present invention, preferably, the mixed gas supply pipe is constituted to pass through the upstream part of the exhaust passageway portion of the steam generator in the direction of exhaust gas flow.

In the invention thus constituted, the mixed gas supply pipe is made to pass through an upstream part of the exhaust passageway portion of the steam generator, and exhaust gas not used for heat exchange in the steam generating portion of the steam generator flows around part of the mixed gas supply pipe, so the temperature of mixed gas in the mixed gas supply pipe can be effectively raised by the exhaust gas. Hence temperature drops in the mixed gas supplied to the reformer can be effectively constrained, and in particular liquefaction of steam in the mixed gas can be reliably constrained.

In the present invention, preferably, an exhaust passageway portion through which the exhaust gas passes and which forms part of the exhaust passageway is formed on the bottom layer of the heat exchanger positioned on the module case side, an oxidant gas passageway portion for passing the oxidant gas is formed on the top layer of the heat exchanger positioned on the top part of the exhaust passageway portion; the heat exchanger and the steam generator are disposed in a horizontal row; and the exhaust passageway portions of the heat exchanger and the steam generator are respectively formed along the horizontal direction.

In the present invention thus constituted, the heat exchanger and steam generator are disposed along the horizontal direction, and an exhaust passageway portion is formed on the respective bottommost layers of the heat exchanger and the steam generator along the horizontal direction, therefore the layout structure for the heat insulating material and the routing of exhaust gas can be optimized, and wasteful heat exchange constrained. Therefore the solid oxide fuel cell apparatus can be reduced in size, and heat exchange can be performed in the heat exchanger and the steam generator, making effective use of heat contained in the exhaust gas.

The present invention preferably comprises a heat exchange module in which the heat exchanger and the steam generator are integrally formed; the heat exchange module comprises a case which is open at the top, and which is approximately U-shaped in cross-section, and which extends in the horizontal direction; both the exhaust passageway portions of the heat exchanger and the steam generator are configured by the case; and the oxidant gas passageway portion of the heat exchanger and the steam generating portion and the mixing portion of the steam generator are affixed in such a way as to cover the open portion of the case.

In the present invention thus constituted, a heat exchange module is used in which a heat exchanger and a steam generator are integrally formed, and the heat exchanger exhaust passageway portion and steam generator exhaust passageway portion are constituted by a case, approximately U-shaped in cross-section and open at the top, such that the respective exhaust passageway portions of the heat exchanger and the steam generator can be made using a single case, thereby enabling the size and cost of the solid oxide fuel cell apparatus to be reduced. In addition, the heat exchanger oxidant gas passageway portion and steam generator steam generating portion and mixing portion are affixed in such a way as to cover the open portion of this heat exchange module case, therefore support of the heat exchanger oxidant gas passageway portion and steam generator steam generating portion and mixing portion can be simplified, thereby enabling a further reduction in size and cost.

In the present invention, preferably, the reformer is disposed in the horizontal direction inside the module case, the exhaust passageway is placed above the reformer, the heat exchanger is disposed above the reformer, and the steam generator is disposed above the reformer; the solid oxide fuel cell apparatus further comprises a gas supply pipe extending so as to traverse the heat insulating material and the interior of the module case in the vertical direction, joining the steam generator and the reformer, and supplying the steam from the steam generator to the reformer; and the steam generator is disposed at a position above the module case which corresponds to the intake side where the steam from the gas supply pipe in the reformer flows in.

In the present invention thus constituted, the steam generator is placed outside the module case, therefore the temperature of exhaust gas inside the module case can be maintained at a high level, and heat exchange characteristics in the heat exchanger can be improved by supplying this high-temperature exhaust gas to the heat exchanger. Therefore oxidant gas appropriately raised in temperature can be supplied to fuel cells, and the temperature in the solid oxide fuel cell apparatus at the time of startup can be raised in a stable and quick manner. However, when the steam generator is placed on the outside of the module case in this manner, the temperature of the steam drops during the process by which steam is supplied from the steam generator to the reformer, as described above, and the temperature of the reformer falls as a result of this low temperature steam, thereby causing the reforming performance of the reformer to drop. In the worst case, there is a possibility that steam will liquefy between the steam generator and the reformer, so that liquefied water is supplied to the reformer, thereby degrading the reformer. The present invention therefore applies a constitution designed to resolve such problems.

Specifically, in the present invention the steam generator is disposed within the heat insulating material at the top of the module case so as to correspond to the intake (gas supply port) side on which steam is supplied to the reformer; in addition, the steam generator and the intake to the reformer are connected by a gas supply pipe which traverses the heat insulating material and the interior of the module case in the vertical direction. This enables the length of the gas supply pipe to be minimized using a simple structure in which the positional relationship between the steam generator and the reformer intake is optimized, thereby solving the problems which occur when the steam reformer is placed outside the module case as described above. More specifically, the present invention is constituted so that the gas supply pipe passes through a minimized pathway length, such that temperature drops in the steam supplied from the gas supply pipe to the reformer can be constrained, and in particular liquefaction of steam during passage in the gas supply pipe can be constrained so that reforming performance in the reformer can be assured.

In addition, in the present invention the aforementioned gas supply pipe is constituted so as to traverse the interior of the module case; i.e., the supply pipe is made to traverse the interior of the module case in the process of connecting the gas supply pipe to the reformer, therefore steam inside the gas supply pipe can be heated by exhaust gas inside the module case, and raised-temperature steam can be supplied to the reformer. Therefore in the present invention a high reforming performance can be achieved with a simple structure even when the steam generator is placed on the outside of the module case.

In the present invention, preferably, an exhaust port communicating with the exhaust passageway is formed so as to allow the outflow of exhaust gas into this exhaust passageway, at a position on the module case corresponding to one side in the horizontal direction of the reformer; a gas supply port, communicating with the gas supply pipe, by which the steam from the gas supply pipe flows into the reformer, is formed at a position on the other side in the horizontal direction of the reformer; the heat exchanger is disposed above the exhaust port and the steam generator is disposed above the gas supply port; and the steam generator is placed relative to the exhaust passageway in such a way as to perform heat exchange with the exhaust gas, the heat of which has been exchanged in the heat exchanger.

In the present invention thus constituted, an exhaust port is formed at a position on the top panel of the module case corresponding to the opposite side of the side on which the gas supply port is disposed on the reformer; the heat exchanger is disposed at the top of this exhaust port, therefore exhaust gas inside the module case is supplied to the heat exchanger over a minimal distance, so that high-temperature exhaust gas can be supplied to the heat exchanger, and the distance over which heat is exchanged between oxidant gas and exhaust gas in the heat exchanger can be lengthened simply by arranging the layout of the exhaust port and the heat exchanger. Therefore in the present invention, using a simple constitution, the temperature of oxidant gas can be appropriately raised in the startup step even with low temperature exhaust gas. This enables the temperature rise time at startup to be shortened and allows for a stable startup. Moreover, because the steam generator is disposed on the downstream side of the heat exchanger and on the intake (gas supply port) side of the reformer, wasteful heat exchange between the heat exchanger and the steam generator can be constrained, and stable steam generating performance in the steam generator can be secured.

In the present invention, preferably, the steam generator includes a steam generating portion for producing steam by vaporizing water, and a mixing portion for mixing the steam and the raw fuel gas, placed at a position upstream of the steam generating portion in the direction of the flow of exhaust gas, and placed in a position closer to the heat exchanger than the steam generator; the gas supply pipe is connected to the mixing portion of the steam generator, and the mixing portion of the steam generator is disposed so that an exit port through which the mixed gas of steam and raw fuel gas is discharged into the gas supply pipe corresponds in the vertical direction to the gas supply port of the reformer; and the gas supply pipe is disposed along the vertical direction so as to traverse the interior of the module case in the vertical direction.

In the present invention thus constituted, the steam generator mixing portion is disposed on the upstream side in the exhaust gas direction of flow, and mixed gas is supplied to the reformer through the gas supply pipe from this mixing portion, therefore heat can be exchanged in the downstream side steam generating portion between the relatively low temperature exhaust gas not used for vaporization and the mixed gas in a gaseous state easily raised in temperature in the mixing portion, and the temperature of the mixed gas can be appropriately raised in the mixing portion. Therefore the reforming performance of the reformer can be effectively stabilized. Also, by using such a constitution, the gas supply pipe passes through a more minimized pathway distance, therefore temperature drops in the mixed gas can be effectively constrained.

In the present invention, preferably, the gas supply pipe is placed so that the end portion on the upstream side in the direction of mixed gas flow projects further upward than the bottom surface of the steam generating portion and mixing portion of the steam generator.

When a steam generator is placed on the outside of a module case as described above, there is a risk that vaporizing performance in the steam generator will drop and that, due to the delay in vaporization, water will drop in the gas supply pipe and be supplied to the reformer, resulting in poor mixing, but by using the present invention the end portion on the upstream side of the gas supply pipe is placed so as to project above the bottom surface of the steam generator steam generating portion and mixing portion, therefore by a simple constitution based on arrangement the gas supply pipe layout, water condensing in the gas supply pipe and being supplied to the reformer can be constrained.

In the present invention, preferably, the gas supply pipe comprises a thermal expansion absorption portion for absorbing thermal expansion differences in a part positioned within the module case.

As described above, by placing the steam generator on the outside of the module case, placing the reformer on the inside of the module case, and joining these with a gas supply pipe which traverses the interior of the module case, there is a risk that due to the large temperature differences, stress caused by expansion differences will be imparted to the gas supply pipe, thereby causing degradation, but in the present invention a thermal expansion absorption portion is placed in the part of the gas supply pipe positioned inside the module case, therefore degradation of the gas supply pipe caused by these large temperature differentials can be appropriately constrained.

In the present invention, preferably, a through-hole extending so as to penetrate through the reformer in the vertical direction, for allowing exhaust gas to pass, is formed on the reformer; and wherein the gas supply pipe is disposed so as to pass through the through-hole in the reformer and connect to the gas supply port on the reformer.

In the present invention thus constituted, the gas supply pipe is disposed in such a way as to pass through a through-hole placed on the reformer, therefore the gas pipe can be a greatly shortened pathway, and mixed gas inside the gas supply pipe in the module case can be efficiently heated using exhaust gas.

In the present invention, preferably, the reformer is disposed in the horizontal direction inside the module case, the exhaust passageway is placed above the reformer, the heat exchanger is disposed above the reformer, and the steam generator is disposed above the reformer; a steam generating portion for producing steam by vaporizing water, and a mixing portion for mixing the steam with raw fuel gas, are formed on the steam generator; the solid oxide fuel cell apparatus further comprises a mixed gas supply pipe extending so as to traverse the heat insulating material and the interior of the module case in the vertical direction, joining the mixing portion of the steam generator and the reformer, and supplying the mixed gas from the mixing portion of the steam generator to the reformer; and the reformer comprises a preheating portion for preheating in-flowing mixed gas, placed on the intake side where the mixed gas flows in from the mixed gas supply pipe, and a reforming portion filled with reforming catalyst, placed on the downstream side of the reforming portion in the direction of mixed gas flow.

In the present invention thus constituted the steam generator is placed outside the module case, therefore the temperature of exhaust gas inside the module case can be maintained at a high level, and heat exchange characteristics in the heat exchanger can be improved by supplying this high-temperature exhaust gas to the heat exchanger. Therefore oxidant gas appropriately raised in temperature can be supplied to fuel cells, and the temperature of the solid oxide fuel cell apparatus can be raised in a stable and quick manner at the time of startup. However, when the steam generator is placed on the outside of the module case in this manner, there are times when the temperature of the steam will drop during the process by which steam is supplied from the steam generator to the reformer, as described above, causing the temperature of the reformer to fall as a result of this low temperature steam, thereby causing the reforming performance of the reformer to drop. In the worst case, there is a possibility that steam will liquefy between the steam generator and the reformer so that liquefied water is supplied to the reformer, and the reformer degrades. The present invention therefore applies a constitution designed to resolve such problems.

Specifically, in the present invention a mixed gas supply pipe connecting the steam generator and the reformer is constituted to traverse the interior of the module case; i.e., it is constituted to traverse the interior of the module case in the process by which the mixed gas supply pipe is connected to the reformer, so that mixed gas in the mixed gas supply pipe is heated by exhaust gas in the module case. In addition, a preheating portion is placed on the upstream side of the reformer in the direction of mixed gas flow in the reformer, and mixed gas in the preheating portion of the reformer is heated by exhaust gas in the module case. By such an invention, mixed gas supplied to the reforming portion of the reformer can be reliably raised in temperature in the mixed gas supply pipe and the preheating portion of the reformer (in this case, needless to say, no liquefaction of steam occurs), and reforming performance in the reformer can be effectively stabilized.

Moreover, in the present invention the mixing characteristics of mixed gas supplied to the reforming portion of the reformer can be improved in the process of causing mixed gas to flow to the steam generator mixing portion, and to the elongated mixed gas supply pipe, one end of which is connected to this mixing portion, and to the reformer preheating section, to which the other end of this mixed gas supply pipe is connected.

In the present invention, preferably, the preheating portion of the reformer is positioned directly above the top end of the multiple fuel cells, and in a position exposed to combustion heat and exhaust gas from the combustion portion; and the solid oxide fuel cell apparatus further comprises an exhaust gas directing portion for directing the stream of exhaust gas from the combustion portion to the preheating portion of the reformer.

In the present invention thus constituted the reformer preheating portion is disposed immediately above the top end of the multiple fuel cells and in a position exposed to combustion heat from the combustion portion and to exhaust gas, therefore the temperature of mixed gas can be appropriately raised in the reformer preheating portion, and problems which occur when the steam generator is placed outside the module case, as described above, can be resolved. In particular, using the present invention, exhaust gas produced by the combustion portion can be actively directed to the reformer preheating portion using the exhaust gas directing portion, therefore the temperature of mixed gas supplied to the reforming portion of the reformer can be reliably raised even when using exhaust gas with a low heat content in the startup step, therefore reforming performance in the reforming portion can be quickly stabilized.

In the present invention, preferably, an exhaust port which communicates with the exhaust passageway and discharges the exhaust gas to the exhaust passageway is formed at a position on the module case above the reformer; and the exhaust gas directed to the preheating portion of the reformer by the exhaust gas directing portion returns after colliding with the preheating portion and then is directed to the exhaust port.

In the present invention thus constituted, exhaust gas directed to the preheating portion of the reformer by the exhaust gas directing portion is directed back to the exhaust gas port after colliding with the preheating portion, therefore exhaust gas can be reliably made to flow around the preheating portion until exhaust gas produced by the combustion portion is discharged from the exhaust port, and mixed gas can be effectively heated inside the preheating portion. Also, by utilizing the increased pressure losses resulting from the return of the exhaust gas, a long heat exchange time between the exhaust gas and the mixed gas inside the preheating portion can be obtained, so that mixed gas is more stably heated.

In the present invention, preferably, a preheating portion for preheating the mixed gas passing through the mixed gas supply pipe is also disposed on that mixed gas supply pipe.

In the present invention thus constituted a preheating portion is also placed on the mixed gas supply pipe, therefore mixed gas supplied to the reforming portion of the reformer can be much more reliably heated.

Using the solid oxide fuel cell apparatus of the present invention, temperature unevenness in the fuel cell module can be eliminated, temperature at time of startup can be effectively raised by improving heat exchange characteristics in the heat exchanger while assuring steam generating characteristics in the steam generator, and running cost can be reduced (electrical generation efficiency raised) during electrical generation.

DETAILED DESCRIPTION OF THE PREFERRED EMBODIMENTS

Next, referring to the attached drawings, we discuss a solid oxide fuel cell apparatus according to an embodiment of the present invention.

First Embodiment

First we explain a solid oxide fuel cell apparatus (SOFC) according to a first embodiment of the present invention.

Figure 1:
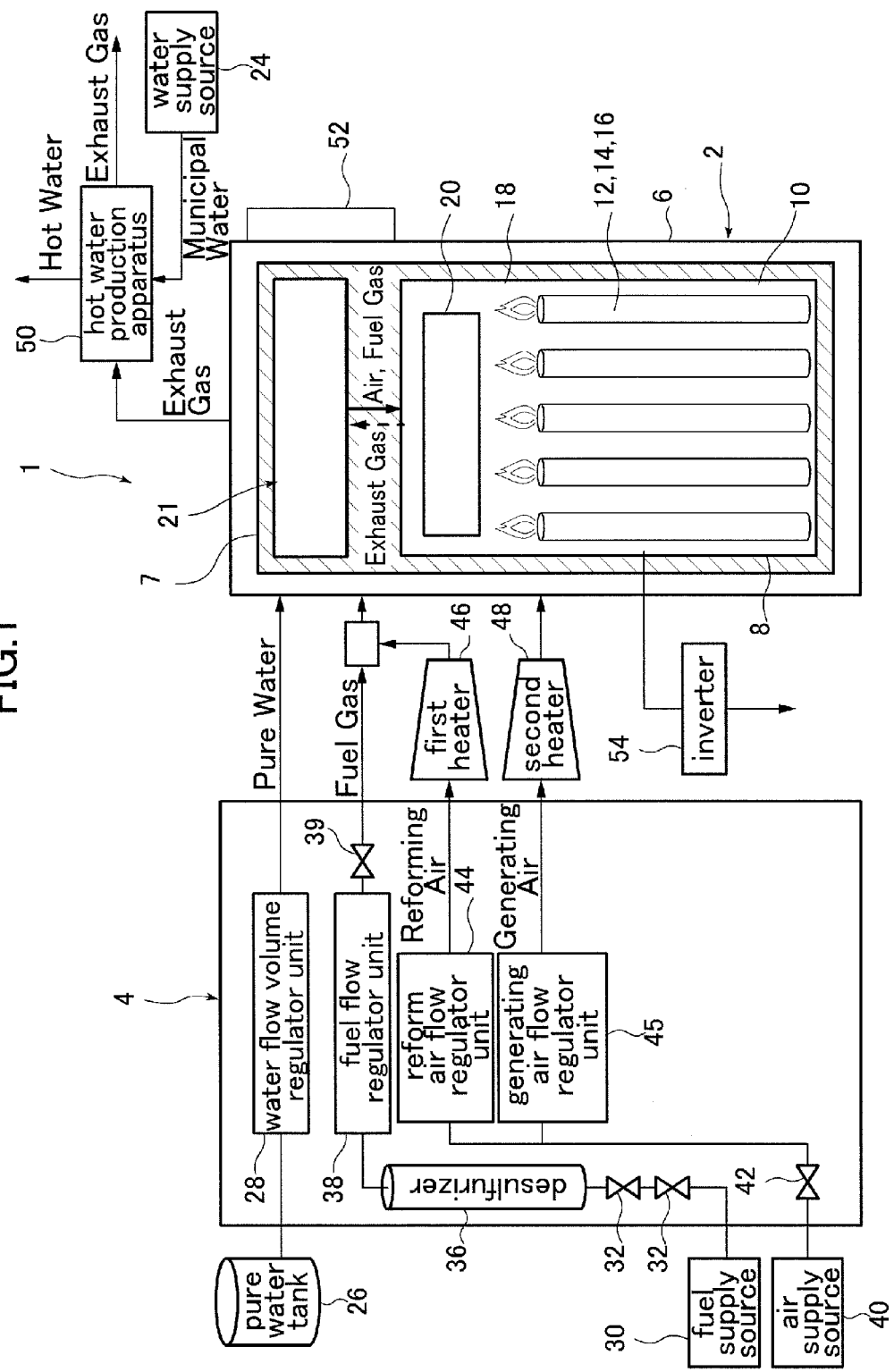
FIG. 1 is an overview diagram showing a solid oxide fuel cell apparatus according to a first embodiment of the present invention.

FIG. 1 is an overview diagram showing a solid oxide fuel cell apparatus according to a first embodiment of the present invention. As shown in FIG. 1, the solid oxide fuel cell 1 of the first embodiment of the invention comprises a fuel cell module 2 and an auxiliary unit 4.

The fuel cell module 2 comprises a housing 6, and a metal module case 8 is built into the interior of this housing 6, mediated by a heat insulating material 7. The fuel cell assembly 12, which performs an electrical generation reaction using fuel gas and oxidant gas (referred to below as "generating air" or "air" as appropriate), is disposed on the generating chamber 10, which is the bottom part of the module case 8, which is this sealed space. This fuel cell assembly 12 comprises nine fuel cell stacks 14 (see FIG. 7), and these fuel cell stacks 14 are constituted by 16 individual fuel-cell units 16 (see FIG. 6), each of which contains an individual fuel cell. In this example the fuel cell assembly 12 houses 144 individual fuel cells 16. In the fuel cell assembly 12, all of the multiple individual fuel cells 16 are connected in series.

A combustion chamber 18 is formed as a combustion portion at the top of the generating chamber 10 in the module case 8 of the fuel cell module 2; the remaining fuel gas and remaining air not used in the electricity generating reaction are combusted in this combustion chamber 18, producing exhaust gas (i.e., combustion gas). Furthermore, the module case 8 is covered by the heat insulating material 7 so that heat inside the fuel cell module 2 is constrained from dissipating to the outside air. Also, a reformer 20 for reforming fuel gas is disposed at the top of this combustion chamber 18, and the reformer 20 is heated to a temperature at which the reforming reaction is possible by the combustion heat of said remaining gas.

Furthermore, a heat exchange module 21 including a heat exchanger (air heat exchanger) 23 and a steam generator 25 (see FIG. 2, etc.) is placed within the heat insulating material 7 at the top of the module case 8 inside the housing 6. In a heat exchanger 23, exhaust gas produced by combustion of residual gas in the combustion chamber 18 and generating air are supplied, and generating air is heated by a heat exchange between this exhaust gas and the generating air heat exchanger 23; this generating air is supplied to the fuel cell assembly 12 inside the module case 8. In a steam generator 25, exhaust gas produced by combustion of residual gas in the combustion chamber 18 and water are supplied, and water is vaporized by the exchange of heat between this exhaust gas and water; the mixed gas (sometimes referred to as "fuel gas") of this steam and raw fuel gas is supplied to the reformer 20 inside the module case 8.

Next, an auxiliary unit 4 comprises a pure water tank 26 for storing water condensed from moisture contained in exhaust from the fuel cell module 2, purified by a filter, and a water flow volume regulator unit 28 (a "water pump" or the like driven by a motor) for adjusting the flow volume of water supply from this reservoir tank. The auxiliary unit 4 comprises a gas shutoff valve 32 for shutting off gas supplied from a municipal gas or other fuel supply source 30, a desulfurizer 36 for removing sulfur from fuel gas, a fuel flow regulator unit 38 (a motor-driven "fuel pump" or the like) for regulating the flow volume of fuel gas, and a valve 39 for shutting off fuel gas flowing out from the fuel flow regulator unit 38 during a loss of power. Furthermore, an auxiliary unit 4 comprises is an electromagnetic valve 42 for shutting off air supplied from an air supply source 40, a reforming air flow regulator unit 44 and generating air flow regulator unit 45 ("air blower" or the like driven by a motor) for adjusting air flow volume, a first heater 46 for heating reforming air supplied to the reformer 20, and a second heater 48 for heating generating air supplied to the generating chamber. This first heater 46 and the second heater 48 are provided in order to efficiently raise the temperature at startup, but may also be omitted.

Next, a hot-water producing device 50 supplied with exhaust gas is connected to the fuel cell module 2. Tap water is supplied from the water supply source 24 to this hot water production device 50; this tap water becomes hot water using the heat of the exhaust gas, and is supplied to an external hot water holding tank, not shown. A control box 52 for controlling the amount of fuel gas supplied, etc., is connected to the fuel cell module 2. Furthermore, an inverter 54 serving as an electrical power extraction unit (electrical power conversion unit) for supplying electrical power generated by the fuel cell module to the outside is connected to the fuel cell module 2.

Figure 2:
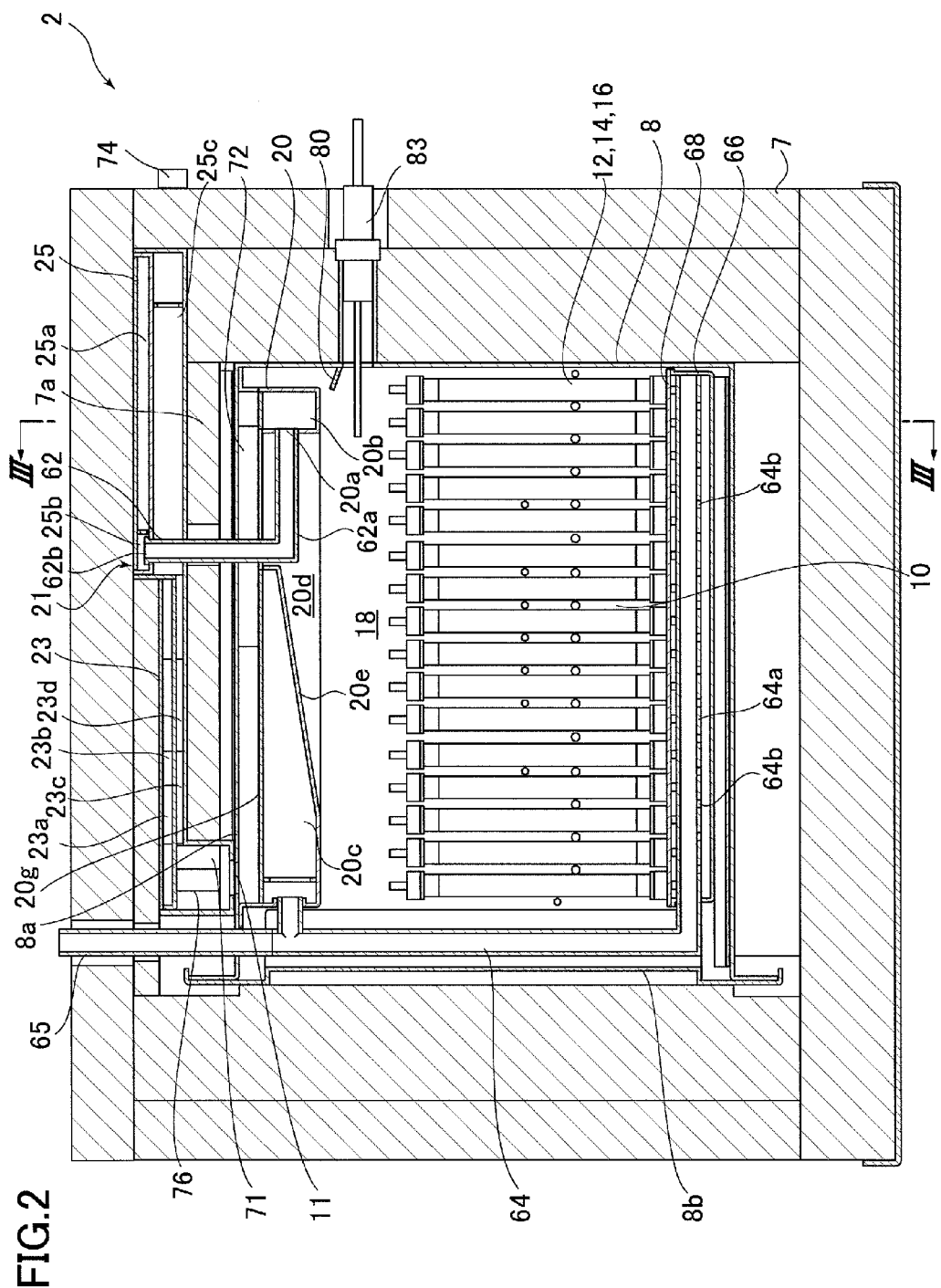
FIG. 2 is a front elevation cross-section showing a fuel-cell module in a solid oxide fuel cell apparatus according to a first embodiment of the present invention.
Figure 3:
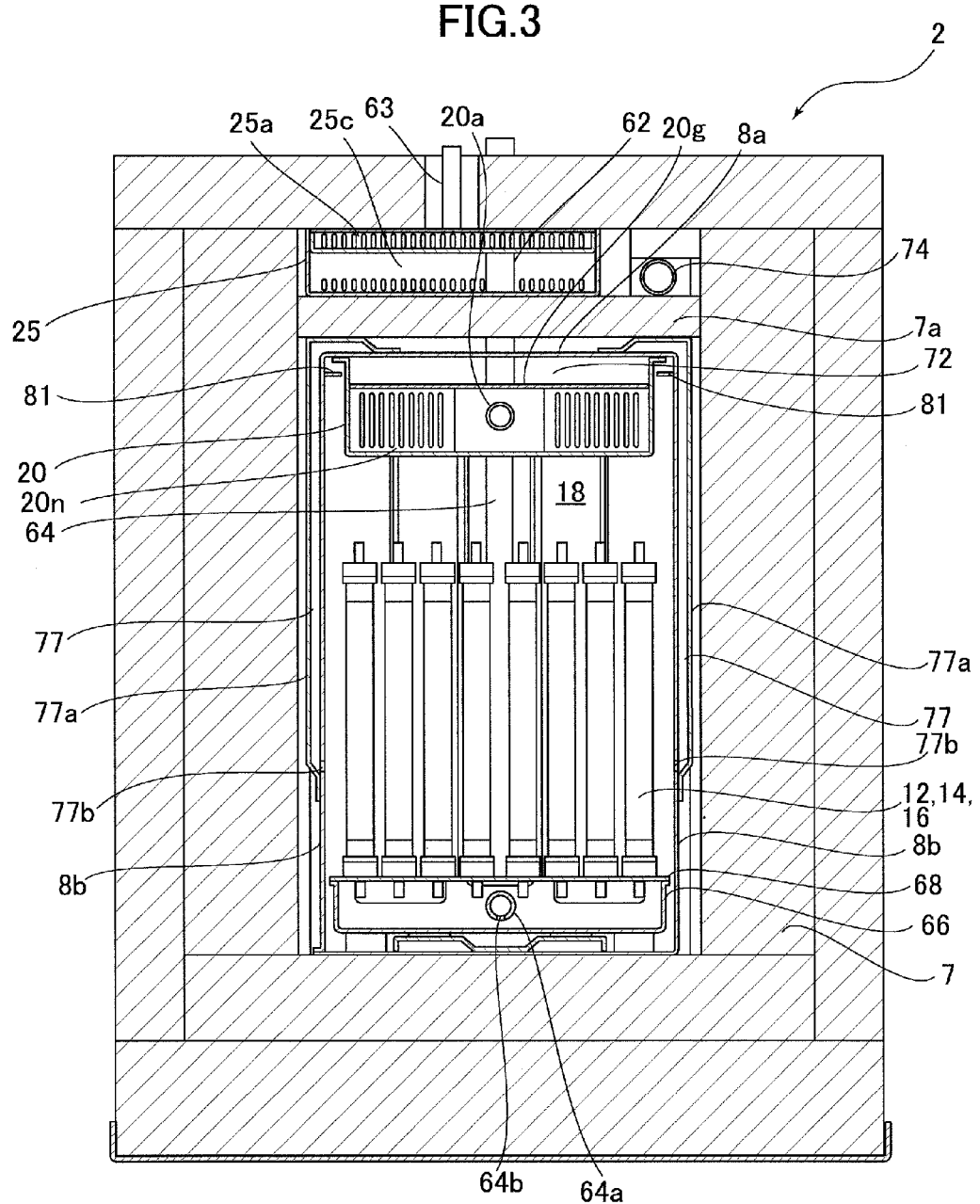
FIG. 3 is a cross-section along line in FIG. 2.
Figure 4:
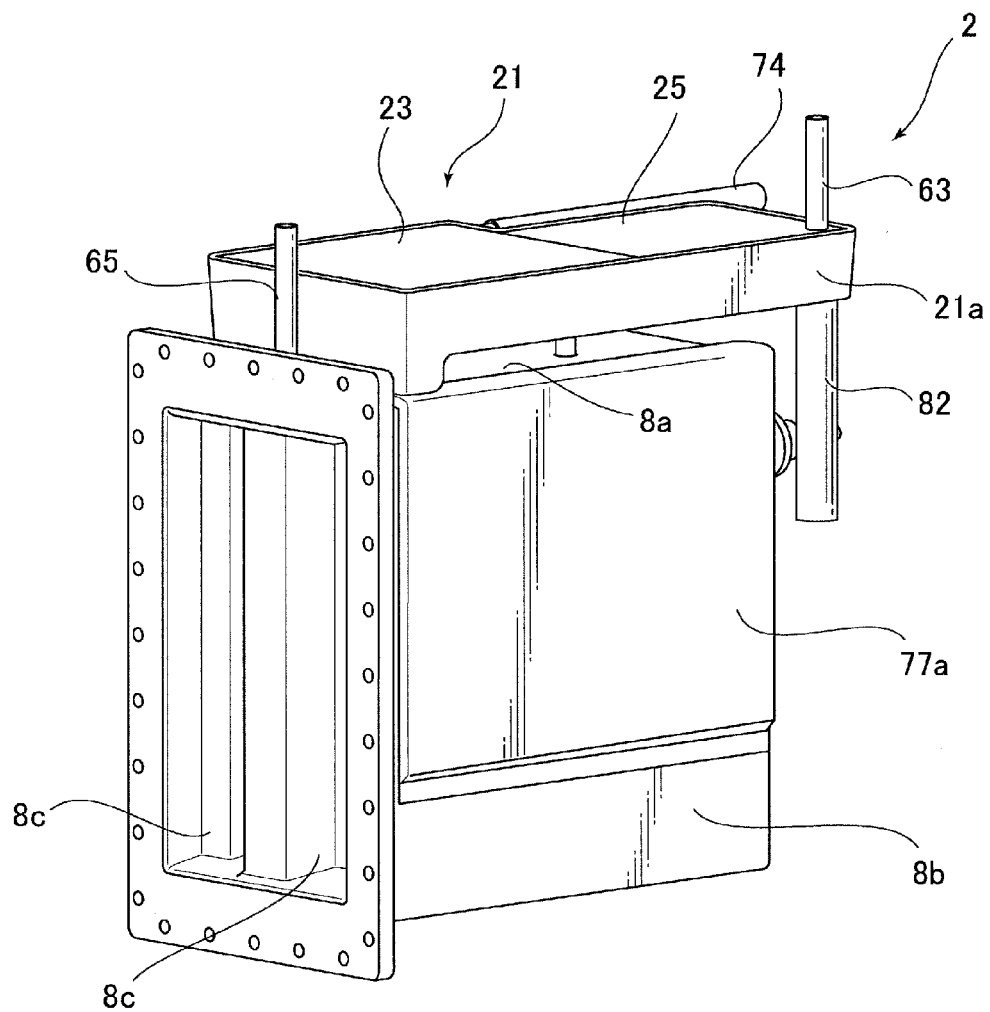
FIG. 4 is a perspective diagram showing the state whereby the insulating material and housing are removed from the fuel cell module in a solid oxide fuel cell apparatus according to a first embodiment of the present invention.

Next, referring to FIGS. 2 through 4, we explain in concrete terms the fuel cell module structure in a solid oxide fuel cell apparatus according to a first embodiment of the present invention. FIG. 2 is a front elevation cross-section showing a fuel-cell module in a solid oxide fuel cell apparatus according to a first embodiment of the present invention; FIG. 3 is a cross-section along line in FIG. 2; FIG. 4 is a perspective diagram showing a fuel cell module with the housing and insulating material removed.

As shown in FIGS. 2 and 3, the fuel cell module 2 has, as described above, a heat exchange module 21 placed on the inside of the heat insulating material 7 and on the outside of the module case 8, and has the fuel cell assembly 12 and reformer 20, placed inside the module case 8.

The heat exchange module 21 has a heat exchanger 23 and steam generator 25 adjacently arrayed in the horizontal direction. In this heat exchange module 21 the heat exchanger 23 and the steam generator 25 are integrally formed, and are affixed to the top panel 8a of the module case 8 (see FIG. 4). Also, a part 7a of the heat insulating material 7 is disposed to fill in a gap between the heat exchange module 21 and the module case 8, and this heat insulating material 7 part 7a is also fixed to the top panel 8a of the module case 8 (see FIGS. 2 and 3).

Next, in the heat exchanger 23 in the heat exchange module 21, a generating air introduction pipe 74 is connected on one end thereof in the horizontal direction (see FIG. 4) and a first exhaust passageway 71 linked to an exhaust port 11 formed on the top panel 8a of the module case 8 (see FIG. 2) is connected to the other end thereof in the horizontal direction. This exhaust port 11 is an opening portion for discharging exhaust gas formed in the combustion chamber 18 inside the module case 8 to a location outside the module case 8, and is formed at a position on the module case 8 top panel 8a corresponding to one end in the horizontal direction of the reformer 20 inside the module case 8; the heat exchanger 23 is disposed inside the heat insulating material 7 at the top of such an exhaust port 11.

In addition, the heat exchanger 23, as shown in FIG. 2, has a two layer structure in the vertical direction; an exhaust passageway portion 23c, through which exhaust gas supplied from the aforementioned first exhaust passageway 71 passes, is formed on the bottom layer part thereof, positioned on the module case 8 side, and a generating air passageway portion 23a (corresponding to the oxidant gas passageway portion), through which generating air supplied from the generating air introduction pipe 74 passes, is formed on the top layer part, positioned in the top portion of this exhaust passageway portion 23c. Inside this generating air passageway portion 23a and exhaust passageway portion 23c, offset fins 23b, 23d are respectively disposed as heat exchange promoting members (see FIG. 2). The offset fins 23b, 23d respectively extend in the horizontal direction along the direction in which gas passing through the generating air passageway portion 23a and exhaust passageway portion 23c advances, and are placed at approximately the same locations in the horizontal direction.

In this type of heat exchanger 23, heat is exchanged between generating air passing through the generating air passageway portion 23a and exhaust gas passing through the exhaust passageway portion 23c (efficient heat exchange particularly occurs in the parts of the generating air passageway portion 23a and exhaust passageway portion 23c where the offset fins 23b, 23d are placed), and the temperature of the generating air is raised by the heat of the exhaust gas.

Additionally, on the heat exchanger 23 generating air passageway portion 23a, a generating air supply pipe 76, formed to pass through the interior of the first exhaust passageway portion 71, is connected to the end portion of the heat exchanger 23 to which the first exhaust passageway 71 is connected (see FIG. 2). This generating air supply pipe 76 is linked to a generating air supply passageway 77 (see FIG. 3), disposed along a side panel 8b on the module case 8 and functioning as an oxidant gas supply passageway. The generating air supply passageway 77 is formed by the space between the module case 8 side plate 8b and the generating air supply case 77a disposed to extend in the vertical direction along this side plate 8b. The generating air supply passageway 77 jets generating air toward the fuel cell assembly 12 from multiple injection ports 77b placed in the lower portion of the module case 8 side plate 8b.

More precisely, generating air supply passageways 77 are respectively disposed on one surface of the module case 8 side plates 8b and on another surface opposing said surface; in other words, there are two generating air supply passageways 77.

Next, the steam generator 25 in the heat exchange module 21 is disposed next to the aforementioned heat exchanger 23 in the horizontal direction as shown in FIG. 2, and is disposed on the downstream side of the exchanger 23 in the direction of exhaust gas flow. More specifically, the steam generator 25 is disposed at one side end at which the exhaust port 11 is disposed on the module case 8 top plate 7a, and inside the heat insulating material 7 at the top of the intake side into which mixed gas flows to the reformer 20 inside the module case 8, which corresponds to the other side end on the opposite side.

In the heat exchanger 25, fuel supply plumbing 63 for supplying water and raw fuel gas (this may also include reforming air) and an exhaust gas discharge pipe 82 for discharging exhaust gas are connected to one side end in the horizontal direction (see FIG. 4), and the heat exchanger 23 exhaust passageway portion 23c is connected to the other side and thereof in the horizontal direction (see FIG. 2). Specifically, the steam generator 25 has a two layer structure in the vertical direction as shown in FIG. 2; an exhaust passageway portion 25c, through which exhaust gas supplied from the exhaust passageway portion 23c passes (i.e., exhaust gas after heat exchange has been performed in the exhaust passageway portion 23c of the heat exchanger 23), disposed next to this exhaust passageway portion 23c in the horizontal direction so as to communicate with the heat exchanger 23 exhaust passageway portion 23c, is formed on a bottom layer part positioned on the module case side. In addition, in the steam generator 25, a steam generating portion 25a for vaporizing water supplied from the fuel supply plumbing 63 to produce steam, and a mixing portion 25b, placed upstream of this steam generating portion 25a in the direction of flow of exhaust gas, for mixing steam produced in the steam generating portion 25a with raw fuel gas supplied from the fuel supply plumbing 63, are formed on the upper layer part positioned at the top portion of this exhaust passageway portion 25c. For example, the steam generating portion 25a and the mixing portion 25b in the steam generator 25 are formed by the space which partitions the steam generator 25 by means of partitioning plates on which multiple communication holes are formed.

In this type of steam generator 25, heat is exchanged between water in the steam generating portion 25a and exhaust gas passing through the exhaust passageway portion 25c, and water inside the steam generating portion 25a is vaporized by the heat of the exhaust gas so that steam is produced. In addition, heat is exchanged between mixed gas in the mixing portion 25b and exhaust gas passing through the exhaust passageway portion 25c, and the temperature of the mixed gas is raised by the exhaust gas heat.

Note that the above-described heat exchanger 23 exhaust passageway portion 23c and steam generator 25 exhaust passageway portion 25c have an approximately U-shaped cross-sectional shape, open at the top as shown in FIG. 4, and are constituted by the horizontally extending heat exchange module 21 case 21a; the heat exchanger 23 generating air passageway portion 23a and the steam generator 25 steam generating portion 25a and mixing portion 25b are constituted by members affixed so as to cover the open portion of this case 21a.

Additionally, as shown in FIG. 2, a mixed gas supply pipe 62 for supplying mixed gas to the reformer 20 inside the module case 8 from the mixed gas portion 25b is connected to the mixing portion 25b on the steam generator 25. The mixed gas supply pipe 62 is linked on one end to a mixed gas supply port 20a placed on the reformer 20; it then is bent by 90° at a point to which it extends in approximately the horizontal direction from this mixed gas supply port 20a; it then extends in approximately the vertical direction so as to traverse the interior of the module case 8, the heat insulating material 7a, and the interior of the exhaust passageway portion 25c on the upstream side in the steam generator 25; the other end thereof is connected to the steam generator 25 mixing portion 25b. In this case, in the mixed gas supply pipe 62, an end portion 62b connected to the steam generator 25 mixing portion 25b is disposed to project above the steam generator 25 steam generating portion 25a and the bottom surface of the mixing portion 25b (see FIG. 12).

Figure 5A:
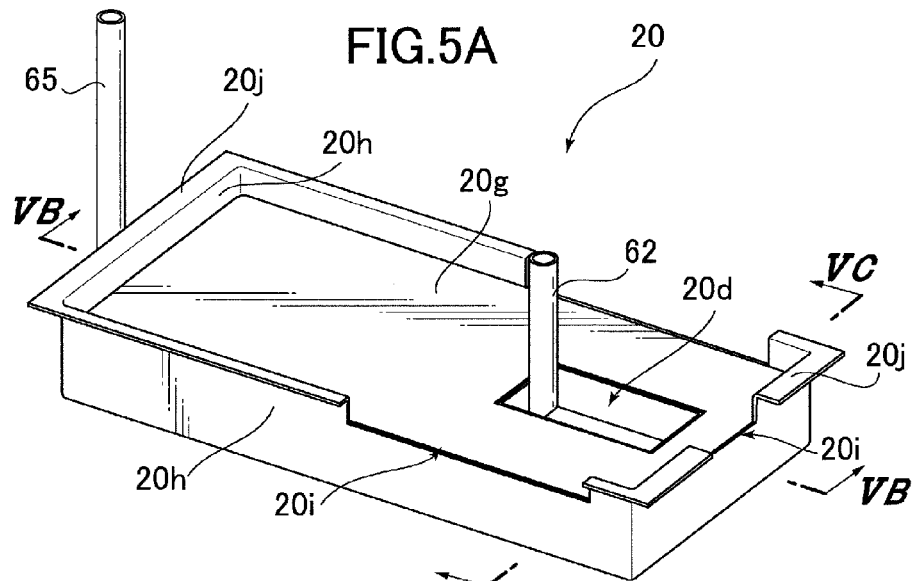
FIG. 5A is a perspective view seen from diagonally above a reformer according to a first embodiment of the present invention.
Figure 5B:
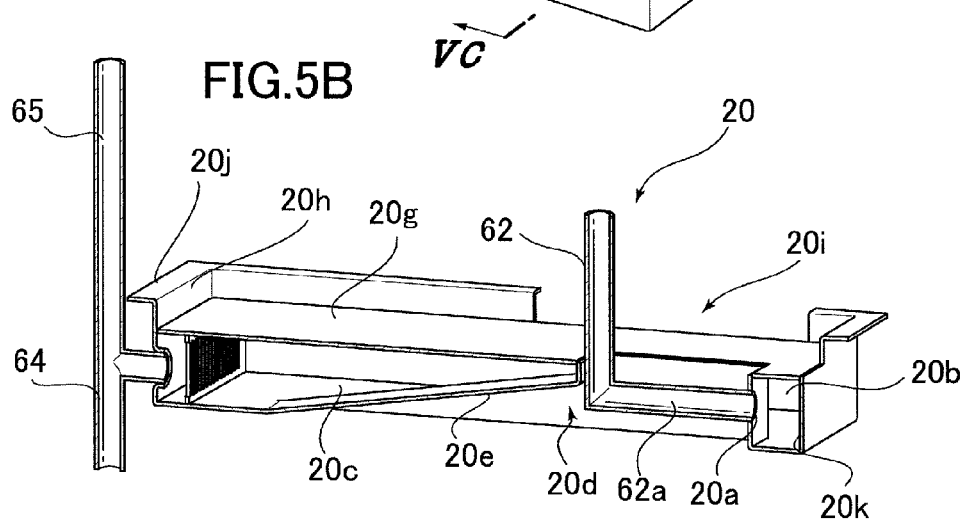
FIG. 5B is a cross-section along line VB-VB in FIG. 5A.
Figure 5C:
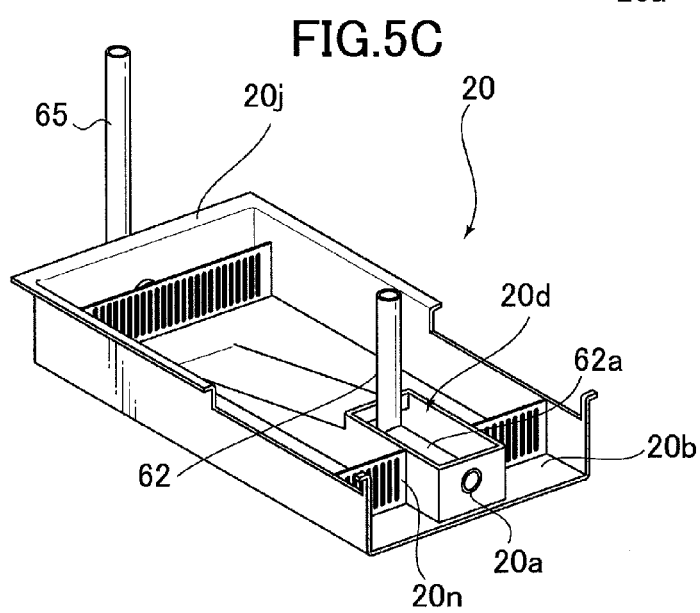
FIG. 5C is a cross-section along line VC-VC in FIG. 5A.

Referring to FIGS. 5A, 5B, and 5C in addition to FIG. 2 and FIG. 3, we explain the reformer 20 placed inside the module case 8. FIG. 5A is a perspective view seen from diagonally above the reformer 20 according to a first embodiment of the present invention; FIG. 5B is a cross-sectional diagram along line VB-VB in FIG. 5A; FIG. 5C is a cross-section along line VC-VC in FIG. 5A, and the reformer 20 is shown with its top plate 20g removed. Note that in addition to the reformer 20, a mixed gas supply pipe 62 and a fuel gas supply pipe 64 and the like are shown in FIGS. 5A, 5B, and 5C.

The reformer 20 is disposed to extend in the horizontal direction above the combustion chamber 18, and is affixed to the top plate 8a at a predetermined spacing from the top plate 8a on the module case 8 (see FIGS. 2 and 3). A preheating portion 20b for preheating this mixed gas, into which mixed gas from the above-described mixed gas supply pipe 62 flows from the mixed gas supply port 20a, and a reforming section 20c, filled with a reforming catalyst (not shown) for reforming mixed gas (i.e., raw fuel gas into which steam has been mixed (may also include reforming air)), placed downstream of the preheating portion 20b in the direction of mixed gas flow, are formed on the reformer 20 (see FIG. 5B). Reforming catalysts in which nickel is applied to the surface of aluminum spheres, or ruthenium is applied to the surface of aluminum spheres, are used as appropriate. The reformer 20 preheating portion 20b and reforming portion 20c are formed by the spaces into which the reformer 20 is partitioned by partitioning plates 20n, in which multiple communication holes are made (FIG. 5C). In the reformer 20, mixed gas from the mixed gas supply pipe 62 is jetted from the mixed gas supply port 20a; this mixed gas is then expanded in the preheating portion 20b and jetting speed drops; jetted mixed gas also collides with a wall surface 20k on the downstream end of the preheating portion 20b and returns, passing through the partitioning plates 20n to be supplied to the reforming section 20c (see FIGS. 5B and 5C).

In the reformer 20, through-hole 20d for allowing exhaust gas produced in the lower combustion chamber 18 to pass through are formed on the reformer 20, extending so as to penetrate said reformer 20 (specifically, the part where the reforming section 20c is formed) (see FIGS. 5A and 5B). Disposed on this through-hole 20d is a part 62a of the mixed gas supply pipe 62 described above, specifically the part of the mixed gas supply pipe 62 extending in the horizontal direction, being the part 62a whose end portion is connected to the mixed gas supply port 20a on the reformer 20. This part 62a of the mixed gas supply pipe 62 also functions as a preheating portion for preheating mixed gas passing through its interior with exhaust gas passing through the through-hole 20d in the reformer 20 (the mixed gas supply pipe 62 part 62a is referred to below as "preheating portion 62a").

In addition, the wall surface of the through-hole 20d in the reformer 20 is formed by a sloped surface 20e for directing exhaust gas produced by the combustion chamber 18 to the preheating portion 20b of the reformer 20 and to the preheating portion 62a of the mixed gas supply pipe 62; this sloped surface 20e functions as an exhaust guide portion (see FIG. 5B). Note that an exhaust guide plate 80 for directing exhaust gas produced in the combustion chamber 18 to the preheating portion 20b of the reformer 20 and to the preheating portion 62a of the mixed gas supply pipe 62 is also provided on the inside surface of the module case 8 (see FIG. 2). This through-hole 20d sloped surface 20e and exhaust guide plate 80 correspond to one example of an exhaust gas guide portion and exhaust gas directing portion.

Moreover, the space formed at the top portion inside the reformer 20 constitutes a second exhaust passageway 72 (see FIGS. 2 and 3). Specifically, the space between the top plate 20g, being is the top surface of the part on which the preheating portion 20b and reforming portion 20c are formed in the reformer 20, and the bottom surface of the module case 8 top plate 8a, forms the second exhaust passageway 72. More specifically, in the reformer 20, a cylindrical portion 20h extending from the top plate 20g to the bottom surface of the top plate 8a of the module case 8 is integrally formed on the outside edge portion of the top plate 20g of the reformer 20, and this cylindrical portion 20h constitutes the outside wall of the second exhaust passageway 72 (see FIG. 5A). In other words, the space enveloped by the reformer 20 top plate 20g and cylindrical portion 20h and by the module case 8 top plate 8a constitutes the second exhaust passageway 72. Also, a flange portion 20j extending toward the outside of the reformer 20 is disposed on the top end portion of the reformer 20 cylindrical portion 20h. In addition, multiple cutaway portions 20i are formed on the reformer 20 cylindrical portion 20h at locations corresponding to one side end and the opposite other side end on which the exhaust port 11 is disposed on the module case 8 top plate 8a; these cutaway portions 20i constitute an exhaust gas introduction intake port for introducing exhaust gas into the second exhaust passageway 72.

Here the exhaust gas flows in to the second exhaust passageway 72 from the above-described through-hole 20d formed on the reformer 20, and from the cutaway portions 20i formed on the cylindrical portion 20h of the reformer 20. As shown in FIG. 3, an exhaust guide plate 81 is disposed on the inside surface of the module case 8, and exhaust gas which has passed between the outside surfaces of the preheating portion 20b and reforming portion 20c and the inside surface of the module case 8 without being allowed to flow into the reformer 20 through-hole 20d is easily made to flow into the reformer 20 cutaway portions 20i serving as exhaust gas introduction ports to the second exhaust passageway 72. Exhaust gas which in this way flows into the second exhaust passageway 72 from the through-hole 20d and cutaway portions 20i in the reformer 20 is discharged through the exhaust port 11 formed on the module case 8 top plate 8a to the aforementioned first exhaust passageway 71.

Next, as shown in FIG. 2, a fuel gas supply pipe 64 serving as fuel gas supply passageway for supplying fuel gas produced by reforming in the reformer 20 reforming portion 20c is connected to the downstream end of the reformer 20, and a hydrogen removal pipe 65 for hydro-desulfurization is connected to the top portion of the this fuel gas supply pipe 64. The fuel gas supply pipe 64 extends downward, then further extends horizontally within the manifold 66 formed at the bottom of the fuel cell assembly 12. Multiple fuel supply holes 64b are formed on the bottom surface of the horizontal portion 64a of fuel gas supply line 64; reformed fuel gas is supplied into the manifold 66 from these fuel supply holes 64b. A lower support plate 68 provided with through holes for supporting the above-described fuel cell stack 14 is attached at the top of manifold 66, and fuel gas in the manifold 66 is supplied into the fuel cell units 16. Also, an ignition device 83 for starting the combustion of fuel gas and air is disposed on the combustion chamber 18.

Figure 6:
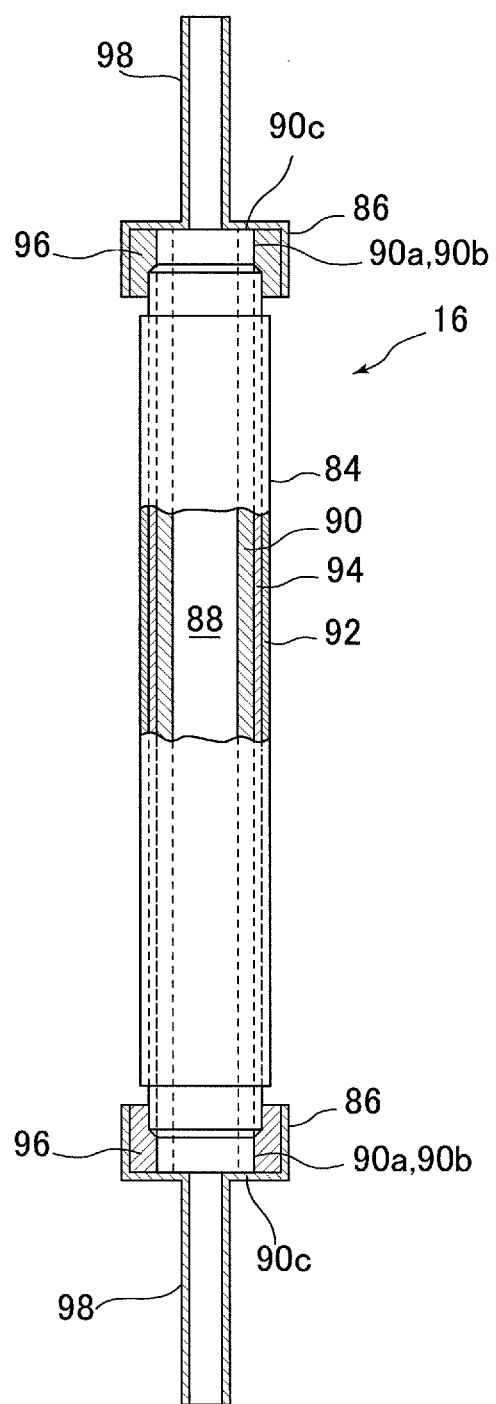
FIG. 6 is a partial section showing a solid oxide fuel cell unit according to a first embodiment of the present invention.

Next, referring to FIG. 6, we discuss individual fuel cell units 16. FIG. 6 is a partial section showing a solid oxide fuel cell fuel cell unit according to a first embodiment of the present invention.

As shown in FIG. 6, the individual fuel cell units 16 comprise individual fuel cells 84 and inside electrode terminals 86, which are caps respectively connected to the two end portions of this fuel cell 84.

The individual fuel cell 84 is a tubular structure extending vertically, equipped with a cylindrical internal electrode layer 90, on the inside of which is formed a fuel gas flow path 88, a cylindrical external electrode layer 92, and an electrolyte layer 94 between the internal electrode layer 90 and the external electrode layer 92. This internal electrode layer 90 is a fuel electrode through which fuel gas passes, and has a (−) polarity, while the external electrode layer 92 is an air-contacting electrode with a (+) polarity.

The internal electrode terminals 86 attached at the top end and bottom end of individual fuel cells 84 have the same structure, therefore here we will discuss specifically the internal electrode terminal 86 attached at the top end side. The top portion 90a of the inside electrode layer 90 comprises an outside perimeter surface 90b and top end surface 90c, exposed to the electrolyte layer 94 and the outside electrode layer 92. The inside electrode terminal 86 is connected to the outer perimeter surface of the inside electrode layer 90 through the conductive seal material 96, and is electrically connected to the inside electrode layer 19 by direct contact with the top end surface 90c of the inside electrode layer 90. A fuel gas flow path fine tubing 98 communicating with the inside electrode layer 90 fuel gas flow path 88 is formed at the center portion of an inside electrode terminal 86.

This flow path fine tubing 98 is elongated fine tubing disposed to extend in the axial direction of the individual fuel cells 84 from the center of the inside electrode terminals 86. Therefore a certain pressure loss occurs in the flow of fuel gas flowing from the manifold 66 (see FIG. 2) into the fuel gas flow path 88 through the flow path fine tubing 98 of inside electrode terminals 86 on the bottom side. Fuel gas flow path fine tubing 98 on the lower inside electrode terminals 86 therefore acts as an inflow-side flow path resistance section, and the flow path resistance thereof is set at a predetermined value. A certain pressure loss also occurs in the flow of fuel gas flowing out from the fuel gas flow path 88 to the combustion chamber 18 (see FIG. 2) through the flow path fine tubing 98 of the inside electrode terminals 86 on the top side. Therefore fuel gas flow path fine tubing 98 on the upper inside electrode terminals 86 acts as an outflow-side flow path resistance portion, and the flow path resistance thereof is set at a predetermined value.

The inside electrode layer 90 is formed, for example, from at least one of a mixture of Ni and zirconia doped with at least one type of rare earth element selected from among Ni, Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among: Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 7:
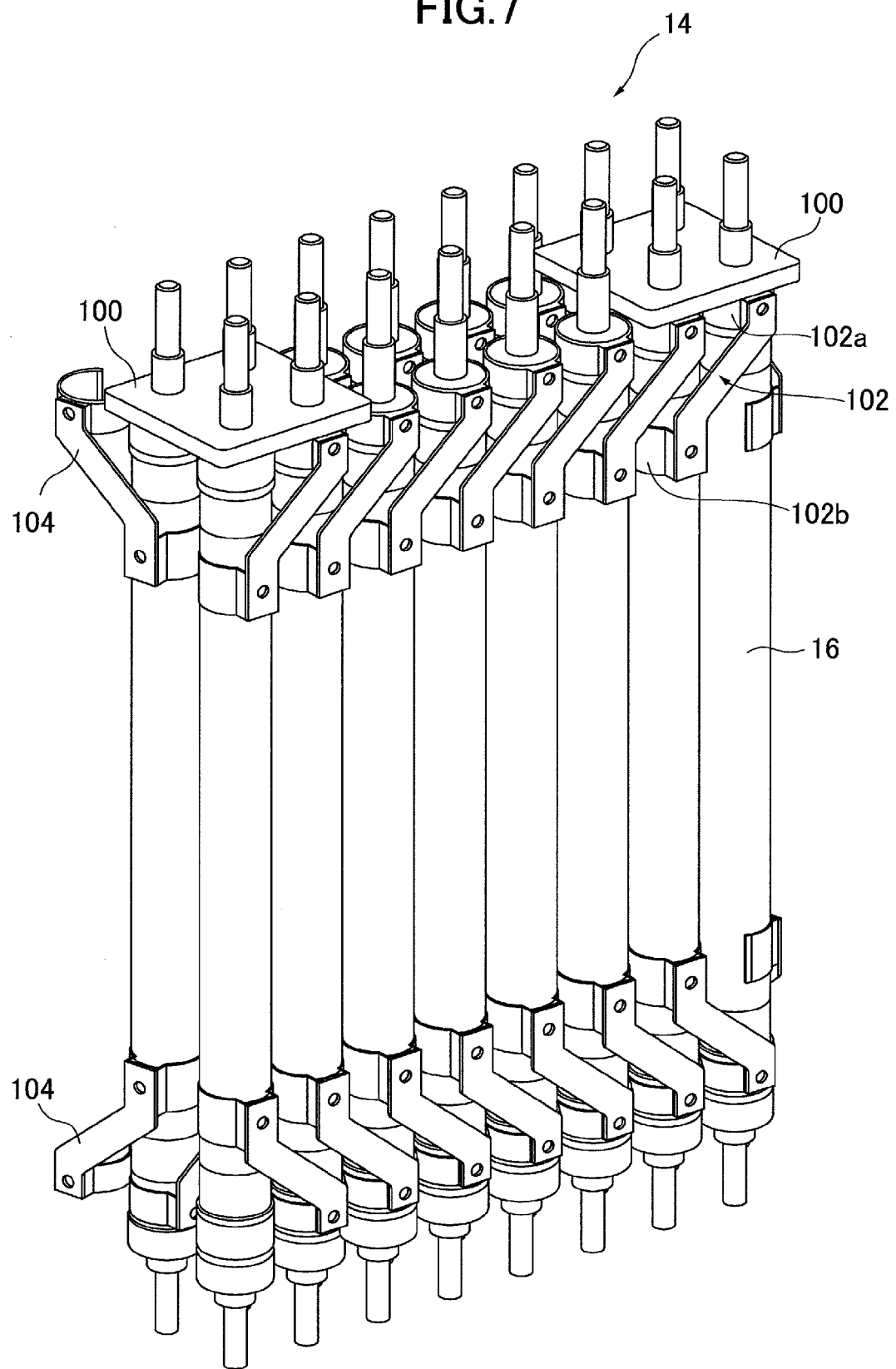
FIG. 7 is a perspective view showing a solid oxide fuel cell stack according to a first embodiment of the present invention.

Next, referring to FIG. 7, we discuss the fuel cell stack 14. FIG. 7 is a perspective view showing the fuel cell stack in a solid oxide fuel cell according to an embodiment of the present invention.

As shown in FIG. 7, the fuel cell stack 14 comprises 16 fuel cell units 16; these fuel cell units 16 are disposed in two rows of 8 cells each.

Each of the fuel cell units 16 is supported by a rectangular lower support plate 68, the bottom end of which is made of ceramic (see FIG. 2); at the top end, four each of the fuel cell units 16 at both ends are supported by two approximately square upper support plates 100. Through holes through which the inside electrode terminals 86 can penetrate are provided on this lower support plate 68 and upper support plates 100.

In addition, a collector 102 and an external terminal 104 are attached to the fuel cell units 16. This collector 102 is integrally formed to connect a fuel electrode connecting portion 102a, electrically connected to the inside electrode terminal 86 attached to the inside electrode layer 90 serving as fuel electrode, and an air electrode connecting portion 102b, electrically connected to the external perimeter of the outside electrode layer 92 serving as air electrode. A thin film made of silver is formed as an electrode on the air electrode-side over the entirety of the outside surface of the outside electrode layer 92 (air electrode) of each of the individual fuel cells units 16. As a result of the contact by the air electrode connecting portion 102b with this thin film surface, the current collector 102 is electrically connected to the entire air electrode.

Moreover, two external terminals 104 are respectively connected to the inside electrode terminals 86 on the fuel cell units 16 positioned at the end of the fuel cell stack 14 (the rear side on the left edge in FIG. 7). These external terminals 104 are connected to the inside electrode terminals 86 on the individual fuel cell units 16 at the edge of the adjacent fuel cell stack 14, and as described above, all 160 of the individual fuel cell units 16 are connected in series.

Figure 8:
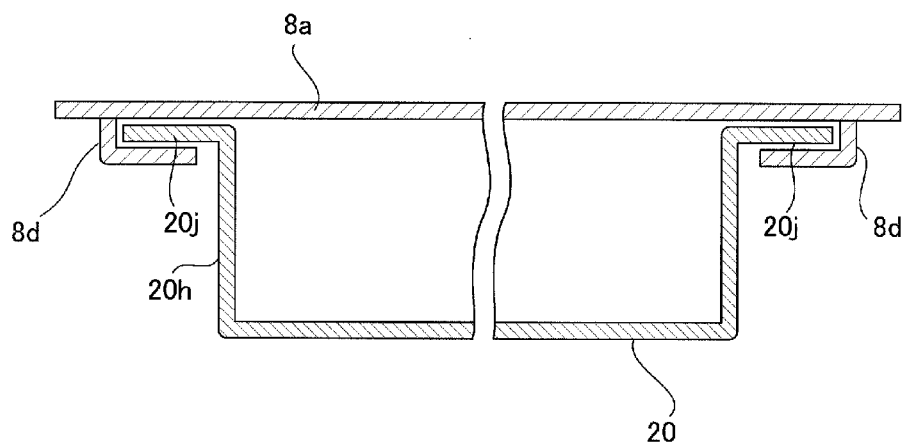
FIG. 8 is a summary cross-section showing the external shape of a reformer and a part of the top panel of a module case according to a first embodiment of the present invention.

Next, referring to FIG. 8, we explain the reformer 20 support structure in the top plate 8a of the module case 8. FIG. 8 is a summary cross-section showing a part of the external shape of the reformer 20 and the top plate 8a of the module case 8.

As shown in FIG. 8, the reformer 20 is supported by the module case 8 top plate 8a through the locking of a flange portion 20j formed at the top end portion of the cylindrical portion 20h at the top of the reformer 20 (see FIGS. 5A-C) with a support portion 8d disposed on the bottom surface of the module case 8 top plate 8a. The flange portion 20j on the reformer 20 corresponds to a locking portion, and the support portion 8d on the module case 8 top plate 8a corresponds to a locked portion. By locking such a flange portion 20j on the reformer 20 to the support portion 8d on the top plate 8a of the module case 8 so as to attach the reformer 20 to the module case 8 top plate 8a, the passage of exhaust gas between the reformer 20 and the module case 8 top plate 8a is blocked, and the reformer 20 is supported so as to be slidable in the horizontal direction relative to the module case 8 top plate 8a. In this case, because the reformer 20 is slidable in the horizontal direction relative to the module case 8 top plate 8a, thermal expansion of the reformer 20 and the mixed gas supply pipe 62 can be absorbed in the horizontal direction.

In this case, the increased pressure loss caused by the return of the exhaust gas can be utilized to secure a long heat exchange time between the exhaust gas and the mixed gas in the preheating portion 20b, so that mixed gas can be heated more stably using a simple structure. This is explained more concretely with reference to FIG. 9.

Figure 9:
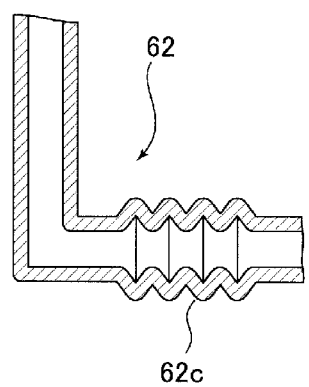
FIG. 9 is a summary cross-section of part of a mixed gas supply pipe constituted to be able to absorb thermal expansion, according to a first embodiment of the present invention.

FIG. 9 is a summary cross-section of part of the mixed gas supply pipe 62 constituted so as to be able to absorb thermal expansion, according to a first embodiment of the present invention. As shown in FIG. 9, a flexible pipe 62c capable of absorbing thermal expansion differences in the horizontal direction is applied to the horizontally extending part of the mixed gas supply pipe 62, i.e., to the part of the mixed gas supply pipe 62 positioned inside the through-hole 20d in the reformer 20 (see FIG. 5B).

Note that in conventional solid oxide fuel cell apparatuses, the reformer was supported from the bottom by a support member disposed on the bottom portion of the reformer. In conventional solid oxide fuel cell apparatuses of this type, the support member supporting the reformer from below was used as a reflecting plate to reflect the heat of the fuel cell units 16, and reflection of heat from the area surrounding each of the multiple fuel cell units 16 was made uniform. More specifically, a corrugated surface was formed relative to the support members supporting the reformer so that the reflection of heat from the area surrounding each of the multiple fuel cell units 16 would be made uniform.

In contrast, in the present embodiment as described above, the reformer 20 is affixed to the module case 8 top plate 8a, and the reformer 20 is supported from above; i.e., the reformer 20 is suspended (see FIG. 8). In the present embodiment thus constituted, the member which supports the reformer 20 cannot be used as a reflecting plate as was done in conventional solid oxide fuel cell apparatuses. For this reason, it is desirable to form the module case 8 side walls 8b so that the reflection of heat from the surrounding area toward each of the multiple fuel cell units 16 is made uniform. Specifically, as shown in FIG. 4, it is desirable to form a convex portion 8c to project on the side of the fuel cell units 16 with respect to the module case 8 side walls 8b facing fuel cell units 16 to which the fuel gas supply pipe 64 is not proximate, so that the thermal distance between the fuel cell units 16 and the surrounding members (i.e., the distance to the members which reflect heat) is equalized relative to the fuel cell units 16 to which fuel gas supply pipe 64 connected to the bottom of the hydrogen removal pipe 65 for hydro-desulfurization (this fuel gas supply pipe 64 works as a member for reflecting heat towards the fuel cell units 16) is proximate, and to the fuel cell units 16 to which fuel gas supply pipe 64 is not proximate. In other words, it is desirable to constitute the module case 8 side walls 8b in such a way that the side walls 8b opposing fuel cell units 16 to which the fuel gas supply pipe 64 is not proximate be positioned further inward than the side walls 8b opposing fuel cell units 16 to which the fuel gas supply pipe 64 is proximate.

Figure 10:
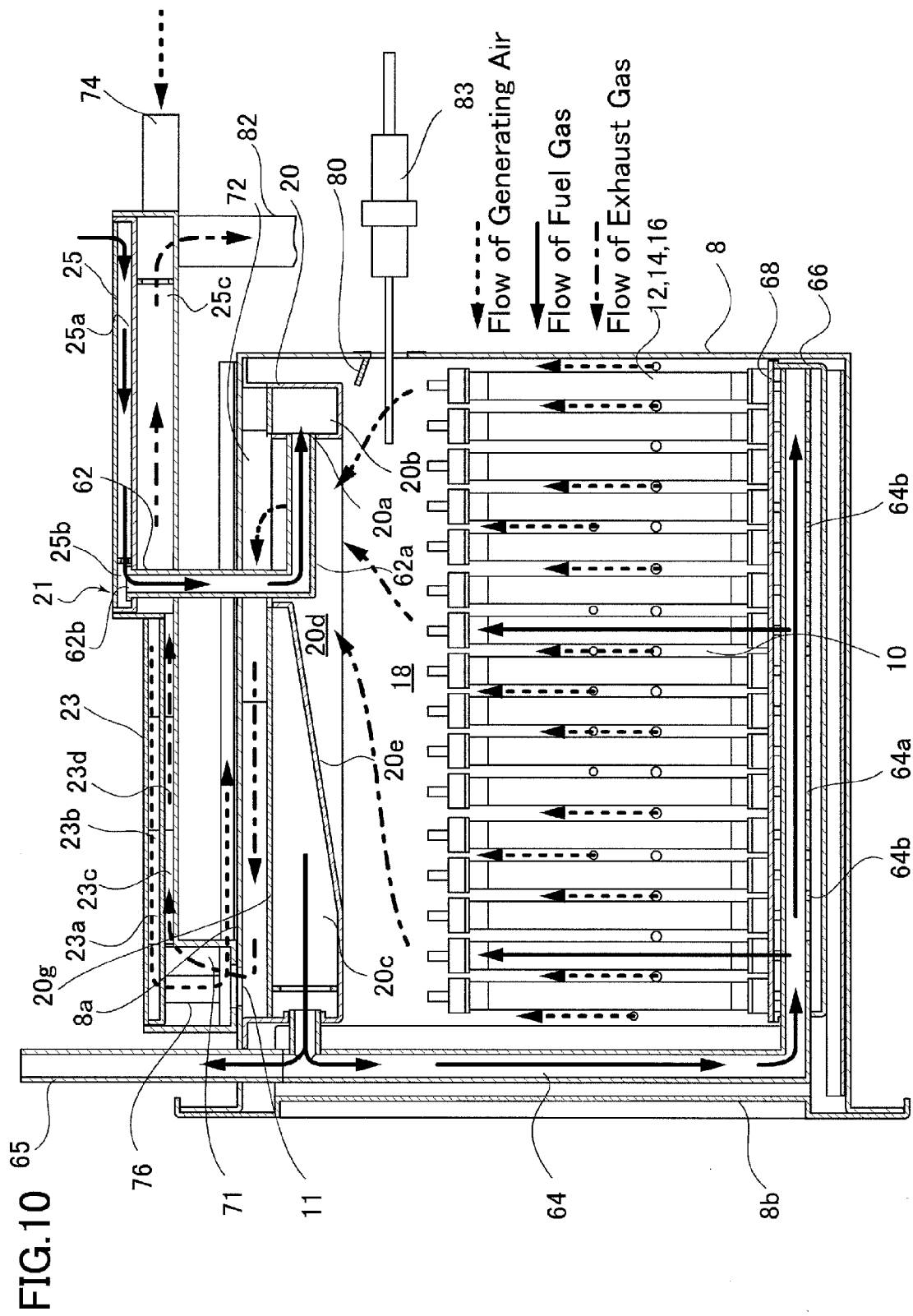
FIG. 10 is a front elevation cross-section showing a fuel cell module for the purpose of explaining the flow of gas in the fuel cell module of a solid oxide fuel cell apparatus according to a first embodiment of the present invention.
Figure 11:
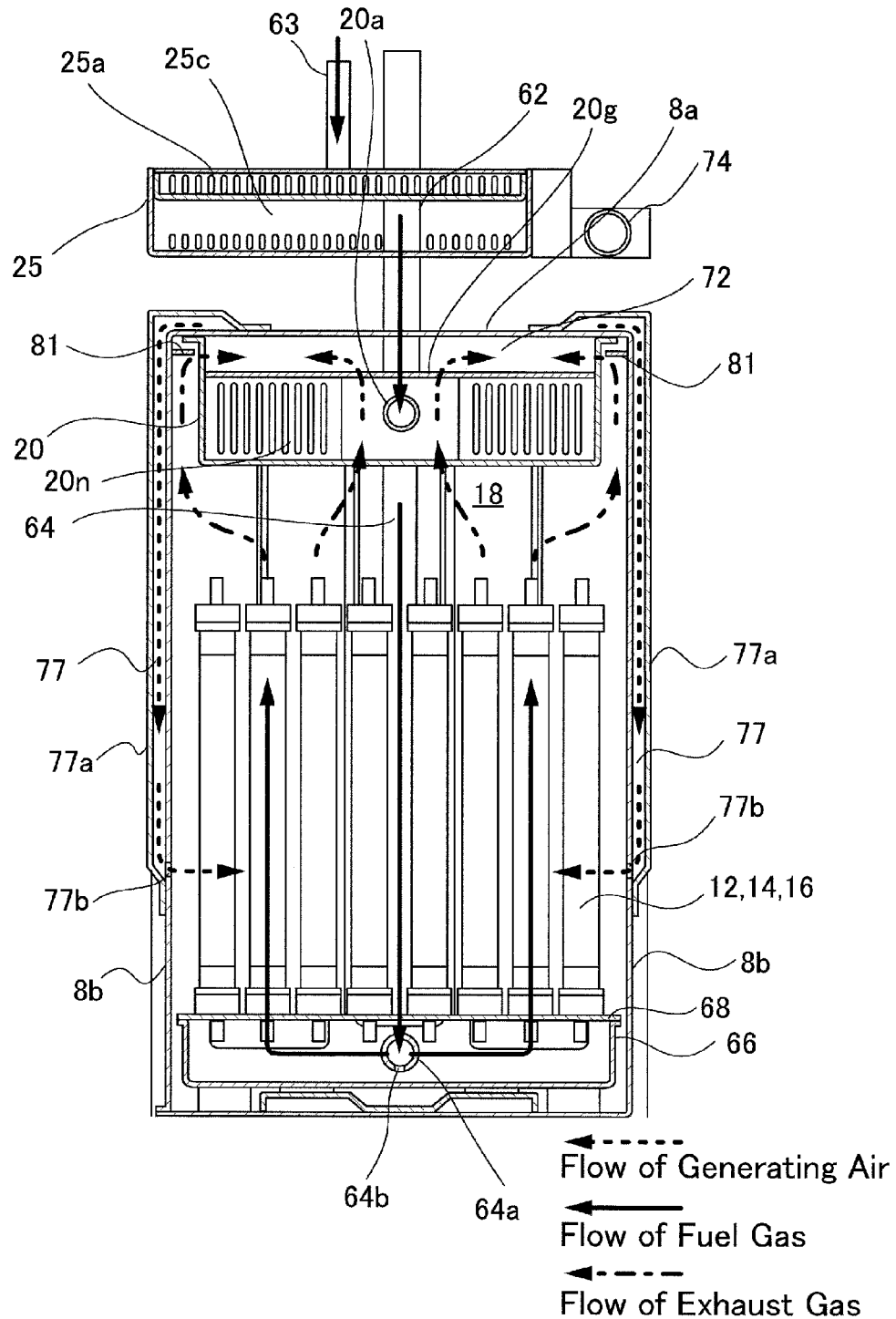
FIG. 11 is a front elevation cross-section along line III-III in FIG. 2 showing a fuel cell module for the purpose of explaining the flow of gas in the fuel cell module of a solid oxide fuel cell apparatus according to a first embodiment of the present invention.

Next, referring to FIGS. 10 and 11, we explain the flow of gas inside the fuel cell module in a solid oxide fuel cell apparatus according to a first embodiment of the present invention. FIG. 10, like FIG. 2, is front elevation cross-section showing a solid oxide fuel cell apparatus fuel cell module according to a first embodiment of the present invention; FIG. 11, like FIG. 3, is a cross-section along line in FIG. 2. FIGS. 10 and 11 are respectively diagrams in which the arrows showing the flow of gas in FIGS. 2 and 3 are again added; for ease of explanation, they are shown with the heat insulating material 7 removed.

As shown in FIG. 10, generating air flows into the heat exchanger 23 from the generating air introduction pipe 74 (see FIG. 4) connected to one end in the horizontal direction of the heat exchanger 23, and flows toward the other end in the horizontal direction thereof within the generating air passageway portion 23a disposed on the top layer of the heat exchanger 23. At this point, generating air flowing inside the generating air passageway portion 23a exchanges heat with the exhaust gas flowing inside the exhaust passageway portion 23c disposed on the bottom layer of the heat exchanger 23 (in particular, an efficient heat exchange is performed in the parts of the generating air passageway portion 23a and exhaust passageway portion 23c where the offset fins 23b, 23d are placed), and the generating air is heated by the heat of the exhaust gas. Generating air heated by exhaust gas in this matter flows through the generating air supply pipe 76 connected to the other end of the heat exchanger 23 in the horizontal direction (the opposite side to the side to which the generating air introduction pipe 74 is connected), and as shown in FIG. 11, flows through the generating air supply passageway 77 disposed along the side walls 8b of the module case 8, to be injected into the generating chamber 10 toward the fuel cell assembly 12 from multiple injection ports 77b disposed on the bottom portion of the module case 8 side walls 8b.

On the other hand, as shown in FIG. 10, water and raw fuel gas (fuel gas) are supplied into the steam generator 25 from the fuel supply plumbing 63 (see FIG. 4) which is connected at one end in the horizontal direction to the steam generator 25 (see FIG. 4), and more specifically into the steam generating portion 25a disposed on the top layer of the steam generator 25. Water supplied to the steam generating portion 25a of the steam generator 25 is subjected to a heat exchange with exhaust gas flowing in the exhaust passageway portion 25c disposed on the bottom layer of the steam generator 25 (as described above, this is exhaust gas already subjected to a heat exchange in the exhaust passageway portion 23c disposed on the heat exchanger 23), and is heated by the heat of the exhaust gas and vaporized to become steam. This steam and the raw fuel gas applied from the above-described fuel supply plumbing 63 flow in the horizontal direction inside the steam generating portion 25a (specifically, they flow in the horizontal direction toward the side opposite the side to which the fuel supply plumbing 63 is connected) and are mixed in the mixing portion 25b beyond the steam generating portion 25a.

The mixed gas (fuel gas) in which steam and raw fuel gas are mixed in the mixing portion 25b flows through the mixed gas supply pipe 62, which is connected to the side opposite the side to which the fuel supply plumbing 63 is connected in the steam generator 25, and extends so as to traverse the reformer 25 exhaust passageway portion 25c, the heat insulating material 7a, and the interior of the module case 8 and flow into the reformer 20 inside the module case 8. In this case, the mixed gas is heated by a heat exchange between exhaust gas flowing in the exhaust passageway portion 25c at the bottom of the mixing portion 25b, exhaust gas flowing around the part of the mixed gas supply pipe 62 positioned inside the exhaust passageway portion 25c, and exhaust gas flowing around the part of the mixed gas supply pipe 62 positioned inside the module case 8. In particular, inside the module case 8 an efficient heat exchange is performed in the preheating portion 62a of the mixed gas supply pipe 62 positioned within the through-hole 20d of the reformer 20, between the mixed gas flowing in the preheating portion 62a and the exhaust gas passing through the through-hole 20d of the reformer 20.

Subsequently, mixed gas supplied from the mixed gas supply pipe 62 to the reformer 20 flows into the preheating portion 20b disposed on one end in the horizontal direction of the reformer 20 through the mixed gas supply port 20a on the reformer 20, and mixed gas flowing into the preheating portion 20b is preheated by the exhaust gas flowing around the preheating portion 20b. In this case, the reformer 20 preheating portion 20b has a structure which is more expanded than the mixed gas supply pipe 62, therefore mixed gas is jetted from the mixed gas supply pipe 62 into the reformer 20 preheating portion 20b, and mixed gas jetted in this manner is expanded in the preheating portion 20b so that the jetting speed drops. Mixed gas then collides with the wall surface 20k on the downstream end side of the preheating portion 20b (see FIG. 5B) and passes partitioning plates 20n (see FIG. 5C) inside the reformer 20 to flow into the reforming portion 20c, which is filled with reforming catalyst, positioned on the downstream side of the preheating portion 20b; it is then reformed in this reforming portion 20c to become fuel gas. Fuel gas produced in this manner flows through the fuel gas supply pipe 64 connected to the downstream end of the reformer 20 reforming portion 20c, and through the hydrogen removal pipe 65 for hydro-desulfurization above this fuel gas supply pipe 64. Fuel gas is then supplied into the manifold 66 from the fuel gas supply pipe 64 disposed on the horizontal portion 64a of the fuel gas supply pipe 64, and fuel gas inside the manifold 66 is supplied into each of the fuel cell units 16.

On the other hand, fuel gas remaining without being used for electrical generation in the fuel cell units 16 is combusted in the combustion chamber 18 inside the module case 8 to become exhaust gas (combustion gas), and rises inside the module case 8 as shown in FIG. 10. Specifically, a portion of the exhaust gas produced by combustion passes through the reformer 20 through-hole 20d and flows into the second exhaust passageway 72 formed on the top portion of the reformer 20 (the space surrounded by the reformer 20 top plate 20g and cylindrical portion 20h and the module case 8 top plate 8a). In this case, exhaust gas is directed to pass through the reformer 20 through-hole 20d by the sloped surface 20e forming the through-hole 20d in the reformer 20. More precisely, a part of the exhaust gas is directed to flow around the reformer 20 preheating portion 20b and the mixed gas supply pipe 62 preheating portion 62a (the part of the mixed gas supply pipe 62 positioned inside the through-hole 20d of the reformer 20) by the sloped surface 20e of the through-hole 20d. In addition, exhaust gas is also directed to flow around the reformer 20 preheating portion 20b and the mixed gas supply pipe 62 preheating portion 62a by the exhaust guide plate 80 disposed on the inside surface of the module case 8. Exhaust gas flowing in this manner exchanges heat with the mixed gas inside the reformer 20 preheating portion 20b and inside the mixed gas supply pipe 62 preheating portion 62a, thereby heating the mixed gas.

On the other hand, as shown in FIG. 11, the remaining portion of the exhaust gas which did not pass through the reformer 20 through-hole 20d passes between the outside surfaces of the reformer 20 preheating portion 20b and reforming portion 20c and the inside surface of the module case 8, and flows into the second exhaust passageway 72 through the cutaway portions 20i (see FIG. 5A) serving as exhaust gas introduction ports formed on the cylindrical portion 20h of the reformer 20. In this case, the exhaust gas is directed to flow into the second exhaust passageway 72 from the cutaway portions 20i on the reformer 20 by the exhaust guide plate 81 disposed on the inside surface of the module case 8.

As shown in FIG. 10, exhaust gas flowing in this manner, into the second exhaust passageway 72 from the reformer 20 through-hole 20d and cutaway portions 20i flows to the first exhaust passageway 71 through the exhaust port 11, which is formed in a position on the module case 8 top plate 8a corresponding to the side opposite the side on which the through-hole 20d and cutaway portions 20i are disposed. Exhaust gas then flows in sequence to the exhaust passageway portion 23c of the heat exchanger 23 connected to the first exhaust passageway 71, then to the exhaust passageway portion 25c of the steam generator 25 joined to this exhaust passageway portion 23c, and is discharged from the exhaust gas discharge pipe 82 (see FIG. 4) connected to the downstream end of the steam generator 25. At this point, the exhaust gas is subjected to a heated exchange with the generating air inside the generating air passageway portion 23a of the heat exchanger 23 as described above, and heat is exchanged between the mixed gas inside the mixing portion 25b of the steam generator 25 and the water inside the steam generating portion 25a of the steam generator 25.

Next, we explain the operational effect of a solid oxide fuel cell apparatus according to a first embodiment of the present invention.

From one standpoint, in the present embodiment the steam generator 25 is disposed inside the heat insulating material 7 on the outside of the module case 8 (see FIG. 2, etc.), therefore temperature unevenness (thermal unevenness) in the fuel cell assembly 12, which can occur when the steam generator 25 is disposed on the inside of the module case 8, can be eliminated. Also, when the steam generator 25 is disposed on the outside of the module case 8, the temperature of the exhaust gas inside the module case 8 can be elevated higher than when the steam generator 25 is disposed on the inside of the module case 8, therefore the heat exchange properties of the heat exchanger 23 can be improved by supplying this high-temperature exhaust gas to the heat exchanger 23. For this reason, generating air which has been appropriately raised in temperature by the heat exchanger 23 can be supplied, and the temperature can be quickly raised at the time of startup in the fuel cell module 2.

In particular, because the heat exchanger 23 is placed further upstream than the steam generator 25 in the direction of exhaust gas flow, a higher temperature gas is supplied to the heat exchanger 23 compared to the case when the heat exchanger 23 is placed downstream of the steam generator 25, therefore (because exhaust gas is being supplied to the heat exchanger 23 before the heat exchange in the steam generator 25) the temperature of the generating air can be effectively raised in the heat exchanger 23, and the temperature of the fuel cell module 2 can be raised further at the time of start up [sic=startup]. In this case, because the steam generator 25 is disposed immediately after the heat exchanger 23 in the direction of exhaust gas flow, and the steam generator 25 is placed inside the heat insulating material 7, no wasteful heat exchange with the exhaust gas occurs, and an appropriate water vaporizing performance can be secured in the steam generator 25.

When a steam generator 25 such as described above is placed outside the module case 8, the temperature of mixed gas supplied to the reformer 20 is lowered (in some cases steam in the mixed gas can liquefy), and the problem of reduced reformer 20 temperature and reduced reforming performance can occur, however in the present embodiment the mixed gas supply pipe 62 linking the steam generator 25 on the outside of the module case 8 to the reformer 20 on the inside of the module case 8 is made to pass through the exhaust passageway portion 25c of the steam generator 25 (see FIG. 2, etc.), and more specifically is made to pass through the part of the exhaust passageway portion 25c on the upstream side in the direction of exhaust gas flow, therefore the temperature of mixed gas can be raised by the exhaust gas flowing through the exhaust passageway portion 25c. For this reason, mixed gas at an elevated temperature can be supplied to the reformer 20 and the type of problem described above when the steam generator 25 is placed outside the module case 8 can be eliminated.

Also, according to the present embodiment, the heat exchanger 23 and steam generator 25 are disposed adjacently in the horizontal direction, and the exhaust passageway portions 23c, 25c are formed in the horizontal direction on the bottom layers of the heat exchanger 23 and steam generator 25, respectively, (see FIG. 2, etc.), therefore the heat insulating material 7 layout structure and exhaust gas routing can be optimized so that wasteful heat exchange can be constrained. Hence the fuel cell module 2 can be reduced in size and, by effectively using the heat in the exhaust gas, heat exchanges can be performed in the heat exchanger 23 and in the steam generator 25.

Also, according to the present embodiment a heat exchange module 21 is used in which the heat exchanger 23 and the steam generator 25 are integrally formed, and the heat exchanger 23 exhaust passageway portion 23c and steam generator 25 exhaust passageway portion 25c are constituted by a case 21a, open at the top and having an approximately U-shaped cross-section (see FIG. 4), so that the exhaust passageway portion 23c and exhaust passageway portion 25c can be made of a single case 21a, thereby reducing the size and cost of the fuel cell module 2. In addition, the heat exchanger 23 generating air passageway portion 23a and the steam generator 25 steam generating portion 25a and mixing portion 25b are affixed in such a way as to cover the open portion of this case 21a, therefore support of the heat exchanger 23 generating air passageway portion 23a and the steam generator 25 steam generating portion 25a and mixing portion 25b can be simplified, and the fuel cell module 2 can be even further reduced in size and cost.

Also, in the present embodiment the heat exchange module 21 is affixed to the module case 8 top plate 8a (see FIG. 4), so the heat exchanger 23 and steam generator 25 can be reliably affixed and supported in a simple manner. In addition, the heat exchange module 21 is supported in a way that sandwiches the heat insulating material 7a (see FIG. 2, etc.), therefore affixing of the heat insulating material 7a can be facilitated and the size and cost of the fuel cell module 2 can be reduced.

From another standpoint, in the present embodiment the steam generator 25 is disposed inside the heat insulating material 7 above the module case 8 intake side (mixed gas supply port 20a) through which mixed gas is supplied to the reformer 20, and the steam generator 25 and reformer 20 intake are joined by the mixed gas supply pipe 62 which traverses the heat insulating material 7 and the inside of the module case 8 in the vertical direction (see FIG. 2, etc.), therefore using a simple constitution in which the positional relationship between the steam generator 25 and the reformer 20 intake is optimized, the length of the mixed gas supply pipe 62 can be minimized and the types of problems described above when the steam generator 25 is placed outside the module case 8 can be eliminated. Specifically, temperature drops in the mixed gas supplied to the reformer 20 can be constrained (in particular, liquefaction [sic=liquefaction] of steam in the mixed gas can be constrained), and reforming performance by the reformer 20 can be secured.

In particular, in the present embodiment a mixed gas supply pipe 62 links the steam generator 25 and the reformer 20 so as to traverse the inside of the module case 8; in other words, the mixed gas supply pipe 62 is made to pass through the inside of the module case 8 in the process of connecting to the reformer 20, therefore mixed gas inside the mixed gas supply pipe 62 can be heated by exhaust gas inside the module case 8, and elevated temperature mixed gas can be supplied to the reformer 20. Therefore even if the steam generator 25 is placed outside the module case 8, a high reforming performance can be achieved in the reformer 20 with a simple constitution.

Also, in the present invention the exhaust port 11 is formed on the top plate 8a of the module case 8 corresponding to the side opposite the side on which the mixed gas supply port 20a is disposed on the reformer 20, and the heat exchanger 23 is disposed above this exhaust port 11 (see FIG. 2, etc.), therefore high-temperature exhaust gas can be supplied over the minimum distance to the heat exchanger 23 and, by simply arranging the layout, the distance over which heat is exchanged between generating air and exhaust gas in the heat exchanger 23 (i.e., the horizontal length of the heat exchanger 23) can be increased. Therefore even when the exhaust gas is low in heat in the startup step, the temperature of the generating air can be appropriately raised, the temperature rise time in the fuel cell module 2 can be shortened, and a stable startup can be achieved using a simple constitution. In addition, because the steam generator 25 is disposed on the downstream side of the heat exchanger 23 and on the side of the intake to the reformer 20 (mixed gas supply port 20a), wasteful heat exchange can be constrained and stable steam generating performance in the steam generator 25 can be secured.

Also, in the present embodiment the steam generator 25 exhaust passageway portion 25c is disposed on the upstream side of the direction of exhaust gas flow, and mixed gas is supplied to the reformer 20 through the mixed gas supply pipe 62 from this exhaust passageway portion 25c (see FIG. 2, etc.), therefore heat can be exchanged between the relatively high temperature exhaust gas not used for vaporization in the downstream mixed gas supply port 25a and the temperature of the mixed gas, which is in a vapor state, can be easily raised in the exhaust passageway portion 25c. Therefore reforming performance of the reformer 20 can be stabilized. With such a constitution, the mixed gas supply pipe 62 can be given a minimum path length, and temperature drops in the mixed gas can be appropriately constrained.

When the steam generator 25 is placed outside the module case 8 as described above, vaporizing performance falls, therefore water can condense in the mixed gas supply pipe 62 due to delayed vaporization and may be supplied to the reformer 20, posing a risk of poor mixing, but in the present embodiment an end portion 62b on the upstream side of the mixed gas supply pipe 62 is placed so as to project above the bottom surface of the steam generating portion 25a and mixing portion 25b of the steam generator 25 (see FIG. 2), therefore water condensing in the mixed gas supply pipe 62 and being supplied to the reformer 20 can be constrained with a simple configuration based on arranging the layout of the mixed gas supply pipe 62.

Also, when the steam generator 25 is placed on the outside of the module case 8 as described above, placing the reformer 20 inside the module case 8 and connecting these with a mixed gas supply pipe 62 traversing the inside of the module case 8 leads to the risk of degradation caused by stress imposed due to the expansion differential in the mixed gas supply pipe 62 resulting from large temperature differences, but in the present invention a flexible pipe 62c capable of absorbing thermal expansion differences in the horizontal direction is applied in the part of the mixed gas supply pipe 62 positioned inside the module case 8 (see FIG. 9), therefore degradation of the mixed gas supply pipe 62 caused by such large temperature differentials can be appropriately constrained.

In addition, in the present invention the reformer 20 is also attached so to be slidable in the horizontal direction relative to the module case 8 top plate 8a, so as to be capable of absorbing thermal expansion in the horizontal direction (see FIG. 8), therefore not only can stress on the reformer 20 be mitigated, but deforming stress in the reformer 20 acting on the mixed gas supply pipe 62 can be constrained, the above-described mixed gas supply pipe 62 flexible pipe 62c can be simplified, and the joint strength of the mixed gas supply pipe 62 to the reformer 20, etc., can be raised to a high level.

Also, in the present invention the mixed gas supply pipe 62 is disposed to pass through the interior of the preheating portion 20b of the reformer 20 (see FIG. 2, etc.), therefore the mixed gas supply pipe 62 can be made into an even more minimal length pathway, and mixed gas in the mixed gas supply pipe 62 can be efficiently heated by exhaust gas inside the module case. In particular, in the present embodiment the sloped surface 20e of the through-hole 20d in the reformer 20 is formed at a position separated from one end side of the reformer 20 corresponding to the exhaust port 11 in the horizontal direction, in such a way as to direct exhaust gas to the mixed gas supply pipe 62, therefore mixed gas in the mixed gas supply pipe 62 positioned inside the through-hole 20*d* of the reformer 20 can be effectively heated, and high-temperature mixed gas can be supplied to the reformer 20, thereby raising the reforming performance of the reformer 20.

From still another standpoint, in the present invention a preheating portion 20*b* is disposed on the upstream side of the reforming portion 20*c* in the direction of mixed gas flow in the reformer 20 (see FIG. 2, etc.), therefore the temperature of the mixed gas can be appropriately raised by the exhaust gas flowing around this preheating portion 20*b*. Therefore mixed gas raised to an appropriate temperature can be supplied to the reforming portion 20*c*, and the reforming performance of the reforming portion 20*c* can be stabilized.

Also, according to the present embodiment the reformer 20 preheating portion 20*b* is disposed immediately above the top end of the fuel cell assembly 12 and in a position exposed to combustion heat and exhaust gas from the combustion chamber 18 (see FIG. 2, etc.), therefore the temperature of the mixed gas can be appropriately raised in the reformer 20 preheating portion 20*b*, and the problems described above when the steam generator 25 is placed outside the module case 8 can be eliminated. In particular, in the present embodiment exhaust gas produced in the combustion chamber 18 is actively directed to the preheating portion 20*b* of reformer 20 by the sloped surface 20*e* of the through-hole 20*d* or the exhaust guide plate 80 disposed on the inside surface of the module case 8 (see FIG. 2, etc.), therefore even when the exhaust gas has a low heat quantity in the startup step, the temperature of the mixed gas supplied to the reforming portion 20*c* of the reformer 20 can be appropriately raised, and the reforming performance of the reforming portion 20*c* can be quickly stabilized.

In addition, in the present embodiment exhaust gas directed to the preheating portion 20*b* of the reformer 20, as described above, is directed back to the exhaust port 11 after colliding with this preheating portion 20*b*, so that mixed gas can be reliably heated without a decrease in the exhaust gas directed at the preheating portion 20*b*. In this case, the increased pressure loss caused by the return of the exhaust gas can be utilized to secure a long heat exchange time between the exhaust gas and the mixed gas in the preheating portion 20*b*, so that mixed gas can be heated more stably using a simple structure.

Also, in the present embodiment a preheating portion 62*a* is disposed on the mixed gas supply pipe 62 so that mixed gas supplied to the reformer 20 can be even more reliably heated. In particular, in the present embodiment the preheating portion 62*a* of the mixed gas supply pipe 62 is placed on the downstream part in the direction of exhaust gas flow and is disposed (see FIG. 2, etc.) to be parallel to a virtual plane formed by the top end portion of the fuel cell assembly 12, in such a way that exhaust gas from the combustion chamber 18 is made to collide with this preheating portion 62*a* (i.e., in such a way that the preheating portion 62*a* is actively exposed to combustion heat, exhaust gas, and so forth), therefore mixed gas can be heated by a simple structure.

Also, in the present invention mixed gas jetted onto the preheating portion 20*b* of the reformer 20 from the preheating portion 62*a* of the mixed gas supply pipe 62 is expanded and drops in flow speed in the preheating portion 20*b* of the reformer 20, therefore by using a simple structure, the heat exchange time between the mixed gas in the preheating portion 20*b* of the reformer 20 and the exhaust gas can be increased, so that the temperature of the mixed gas can be effectively raised. In addition, in the present invention mixed gas inside the preheating portion 20*b* of the reformer 20 collides with the wall surface 20*k* on the downstream end side of the preheating portion 20*b*, turns back, and flows into the reforming portion 20*c*, therefore an effective heat exchange through the wall surface which forms the preheating portion 20*b* and an expansion of the heat exchange time can be appropriately achieved without expanding the volume of the preheating portion 20*b* at the sacrifice of reforming portion 20*c* volume. In addition, in the present invention mixed gas flows as described above in the preheating portion 20*b* of the reformer 20, so the mixing characteristics of the mixed gas in this preheating portion 20*b* can be improved.

Also, in the present invention the preheating portion 62*a* of the mixed gas supply pipe 62 is disposed inside the through-hole 20*d* of the reformer 20 (see FIG. 2, etc.), therefore the temperature of the mixed gas can be effectively raised in the preheating portion 62*a* of the mixed gas supply pipe 62. In particular, in the present invention exhaust gas is directed toward the preheating portion 20*b* of the reformer 20 and the preheating portion 62*a* of the mixed gas supply pipe 62 by the sloped surface 20*e* of the through-hole 20*d* in the reformer 20, therefore an efficient heat exchange between mixed gas and exhaust gas in the preheating portions 20*b*, 62*a* of the reformer 20 and the mixed gas supply pipe 62 can be achieved without an increase in complexity of the structure.

From still another standpoint, in the present embodiment the reformer 20 is affixed to the top plate 8*a* in a way that permits it to slide in the horizontal direction at a certain distance of vertical separation from the top plate 8*a* of the module case 8; i.e., the reformer 20 is suspended from the top plate 8*a* of the module case 8 (see FIGS. 2 and 3, etc.), therefore a reduction in the size and cost of the fuel cell module 2 can be achieved. We will now explain this more specifically. In a configuration pertaining to a comparative example in which support is given from the bottom using a support member such as a bracket on the bottom plate of the reformer, because the support member is disposed at a distance from the fuel cell units 16, which become hot, the size of the fuel cell module is increased, or support members capable of withstanding high temperatures are required, thus increasing cost. In contrast to this, in the present embodiment when the reformer 20 is suspended from the top plate 8*a* of the module case 8 there is no need to secure distance from the fuel cell units 16 as in the comparative example, therefore the size of the fuel cell module 2 can be reduced and, since there is no need to use a support member capable of withstanding high temperatures as there is in the comparative example, the cost of the support mechanism for the reformer 20 can be reduced.

In addition, in the present embodiment the second exhaust passageway 72, which communicates with the exhaust port 11 formed on the top plate 8*a* of the module case 8, is formed inside the module case 8 (see FIG. 2, etc.) by the exhaust passageway wall (specifically cylindrical portion 20*h*) which is integrally formed with the reformer 20, therefore the exhaust passageway wall can also serve as a support member for the reformer 20 on the top plate 8*a* of the module case 8 while securing exhaust performance to discharge exhaust gas, and can thereby even further reduce the size of the fuel cell module 2.

Also, in the present embodiment the above-described exhaust passageway wall of the second exhaust passageway 72 is formed by the cylindrical portion 20*h* extending upward from the edge portion of the top plate 20*g* on the reformer 20, while cutaway portions 20*i* serving as exhaust gas introduction ports for introducing exhaust gas into the second exhaust passageway 72 are formed at locations on the cylindrical portion 20*h* corresponding to the side opposite the side on which the exhaust port 11 is placed on the top plate 8*a* of the module case 8 (see FIG. 2 and FIGS. 5A-C, etc.), therefore exhaust flow is optimized such that the degree of placement freedom of the exhaust port 11 on the top plate 8*a* can be increased and the size of the heat exchanger 23 can be reduced. In addition, by cutting out the cylindrical portion 20*h*, which is the part supporting the reformer 20 relative to the top plate 8*a* of the module case 8, an exhaust gas introduction intake can be simply formed while securing support of the reformer 20 relative to the top plate 8*a*.

Also, in the present embodiment an exhaust guide plate 81 for directing exhaust gas to these cutaway portions 20*i* is placed (see FIG. 3) in a position on the inside surface of the module case 8 corresponding to the cutaway portions 20*i* (exhaust gas introduction intake) in the reformer 20, therefore even if the distance between the top plate 20*g* of the reformer 20 and the top plate 8*a* of the module case 8 is made small, i.e., even if the width of the second exhaust passageway 72 in the vertical direction is made small, exhaust gas can be reliably introduced into the second exhaust passageway 72 from the cutaway portions 20*i* of the reformer 20. We shall now explain this more specifically. In a configuration whereby the reformer 20 is suspended from the top plate 8*a* of the module case 8 as described above, the member supporting the reformer 20 relative to the top plate 8*a* (specifically, the cylindrical portion 20*h*) cannot be made too long because a heavy reformer 20 or a high temperature will cause the strength of the support member to decrease; in other words, it will be difficult to increase the distance between the top plate 20*g* on the reformer 20 and the top plate 8*a* on the module case 8. The width in the vertical direction of the second exhaust passageway 72 thus diminishes, making it difficult to introduce exhaust gas into the second exhaust passageway 72; in other words, it becomes difficult to introduce exhaust gas into the second exhaust passageway 72 from the cutaway portions 20*i* in the cylindrical portion 20*h* serving as exhaust gas introduction intake. Therefore in the present embodiment an exhaust guide plate 81 is provided to direct exhaust gas to the cutaway portions 20*i* serving as exhaust gas intakes. By so doing, even if the distance between the top plate 20*g* of the reformer 20 and the top plate 8*a* of the module case 8 is made small, exhaust gas can be reliably introduced into the second exhaust passageway 72 from the cutaway portions 20*i* in the reformer 20, thereby enabling the fuel cell module 2 to be reduced in size.

Also, when the vertical width of the second exhaust passageway 72 is made small as described above, pressure losses increase and exhaust performance declines, but in the present embodiment a through-hole 20*d* is placed in the reformer 20 and exhaust gas is introduced into the second exhaust passageway 72 from this through-hole 20*d* as well (see FIG. 2, etc.), hence exhaust gas can be reliably introduced into the second exhaust passageway 72 even if pressure losses are high. In this case, the amount of high temperature exhaust gas winding around the top surface of the reformer 20 (specifically, the top plate 20*g* of the reformer 20) increases, so the temperature raising performance of the reformer 20 by the exhaust gas can be increased.

Also, in the present embodiment a through-hole 20*d* is formed at a location on the reformer 20 corresponding to the side opposite the side on which the exhaust port 11 is disposed on the top plate 8*a* of the module case 8, therefore exhaust flow can be optimized using a simple structure, and the temperature can be raised uniformly inside the module case 8 and over the entire reformer 20.

In addition, in the present embodiment a flange portion 20*j* placed on the top end portion of the cylindrical portion 20*h* of the reformer 20 is locked onto a support portion 8*d* on the top plate 8*a* of the module case 8, and the reformer 20 is supported so as to be slidable in the horizontal direction relative to the top plate 8*a* of the module case 8 (see FIG. 8), therefore thermal expansion of the reformer 20 can be appropriately absorbed. In this case, thermal expansion of the reformer 20 is absorbed by the support mechanism for the reformer 20 relative to the top plate 8*a* of the module case 8, therefore the fuel cell module 2 can be made compact without the need for separately applying an apparatus to absorb thermal expansion. In addition, by locking the flange portion 20*j* of the reformer 20 to the support portion 8*d* on the top plate 8*a* of the module case 8, fluid movement of exhaust gas between this flange portion 20*j* and the support portion 8*d* is constrained, so performance of the second exhaust passageway 72 (specifically, air-tightness) can be appropriately secured.

Also, in the present embodiment, a convex portion 8*c* is integrally formed with the side walls 8*b* of the module case 8 so as to project to the fuel cell units 16 side (see FIG. 4), and equalizes the reflection of heat from the surrounding area back to each of the multiple fuel cell units 16, so that the fuel cell module 2 can be made compact without a requirement to use a separate heat reflecting plate.

Figure 12:
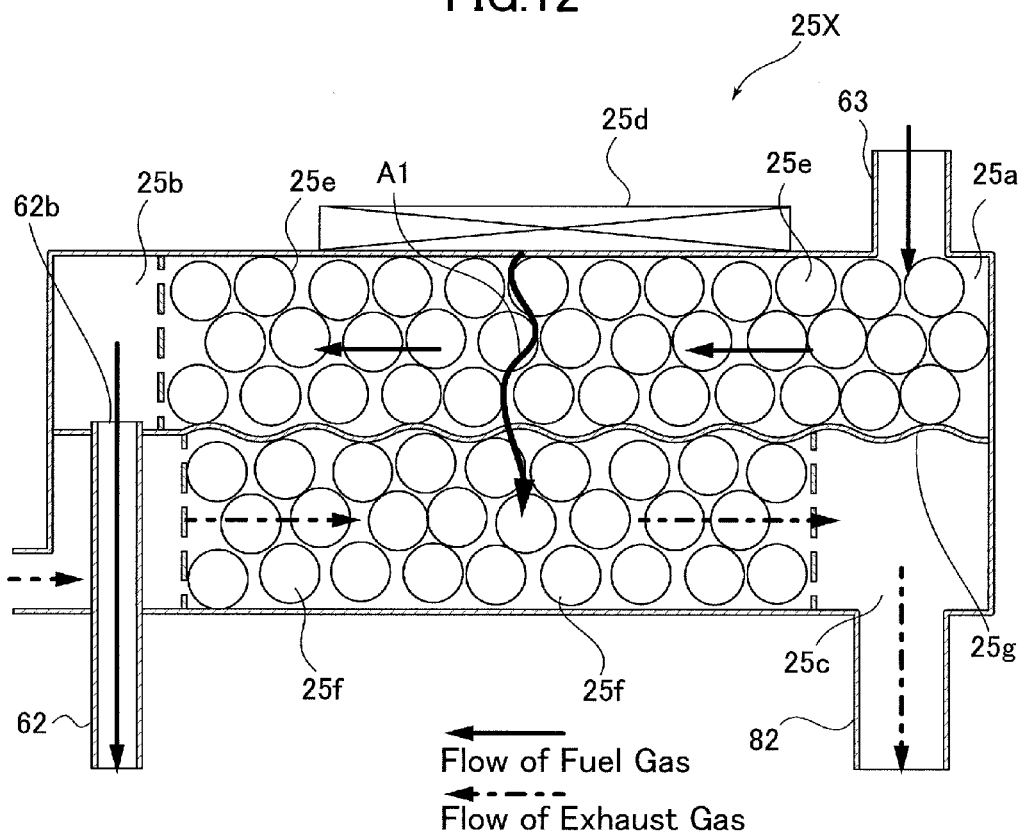
FIG. 12 is a summary cross-section of a steam generator according to a variant example of a first embodiment of the present invention.

Next, referring to FIG. 12, we explain a steam generator according to a variant example of the first embodiment of the present invention. FIG. 12 is a summary cross-section of a steam generator according to a variant example of a first embodiment of the present invention. Here we explain only elements differing from the above-described steam generator 25.

As shown in FIG. 12, in a steam generator 25X according to a variant example, ceramic balls 25*e* are filled into the interior of the steam generator 25*a* on the top layer; the ceramic balls 25*f* supporting an exhaust cleaning catalyst (i.e., a combustion catalyst) with the function of cleaning exhaust gas are filled into the interior of the exhaust passageway portion 25*c* on the bottom layer, and the interface surface between the steam generating portion 25*a* and the exhaust passageway portion number 25*c* is formed by a corrugated surface 25*g*. Also, in the steam generator 25X, a heater 25*d* such as a ceramic heater is placed at the top portion of the steam generating portion 25*a*. In other words, in the steam generator 25X a heater 25*d*, a steam generating portion 25*a* (also including mixing portion 25*d*), and an exhaust passageway portion 25*c* are disposed in sequence above and below, and the heat insulating material 7 is disposed on the top portion of the heater 25*d* and on the bottom portion of the exhaust passageway portion 25*c* (not shown in FIG. 12; see FIGS. 2 and 3).

Thus, using a steam generator 25X in which an exhaust passageway portion 25*c* is filled with exhaust cleaning catalyst, during a cold start, in which exhaust containing a large amount of CO is produced, heat is emitted when the exhaust cleaning catalyst inside the exhaust passageway portion 25*c* removes the CO (because the reforming which removes CO with an exhaust cleaning catalyst is an exothermic reaction), and the heat produced by this exhaust cleaning catalyst (oxidation reaction heat) can heat the steam generating portion 25*a* from below. In other words the steam generating portion 25a can be heated not only by the heat of exhaust gas passing through the exhaust passageway portion 25c, but also by the oxidation reaction heat produced by the exhaust cleaning catalyst in the exhaust passageway portion 25c. Thus with a relatively simple steam generator 25X, stable vaporization of water in the steam generating portion 25a can be promoted and steam generated in the steam generating portion 25a can be reliably supplied to the reformer 20, thereby achieving stable reforming in the reformer 20.

Also, because the heater 25d is placed on the upper portion of the steam generating portion 25a, the use of this heater 25d during a cold start enables not only oxidation reaction heat produced by the exhaust cleaning catalyst in the exhaust passageway portion 25c as described above but also heat from the heater 25d to be transferred to the steam generating portion 25a; in other words the steam generating portion 25a can be heated from both above and below, and stable vaporization in the steam generating portion 25a and stable reforming in the reformer 20 can be effectively achieved. In this case, a single heater 25d can serve the dual purpose, as appropriate, of heating to activate the exhaust cleaning catalyst in the exhaust passageway portion 25c during a cold start and heating the steam generating portion 25a as described above, hence it is not necessary to deploy two heaters for these two purposes.

In particular, by filling the interiors of both the steam generating portion 25a and the exhaust passageway portion 25c with the ceramic balls 25e, 25f, i.e., by filling the entirety of the steam generating portion 25a interior and the exhaust passageway portion 25c interior with the ceramic balls 25e, 25f so as to pass the heat of the heater 25d from the steam generating portion 25a to the exhaust passageway portion 25c, the heat of the heater 25d can be efficiently transferred to the exhaust passageway portion 25c through the steam generating portion 25a, using the ceramic balls 25e, 25f as a heat transfer member (see arrow A1 in FIG. 12). By the simple arrangement of filling with ceramic balls 25e, 25f, the exhaust cleaning catalyst inside the exhaust passageway portion 25c can be rapidly activated, and the steam generating portion 25a can be effectively heated from below by the oxidation reaction heat of this exhaust cleaning catalyst.

Also, by forming an interface surface between the steam generating portion 25a and the exhaust passageway portion 25c as a corrugated surface 25g, the contact surface area between the ceramic balls 25e and ceramic balls 25f sandwiched between the steam generating portion 25a and the exhaust passageway portion 25c is expanded, so an effective bridging of the heat from the heater 25d can be achieved through the ceramic balls 25e, 25f.

Figure 13:
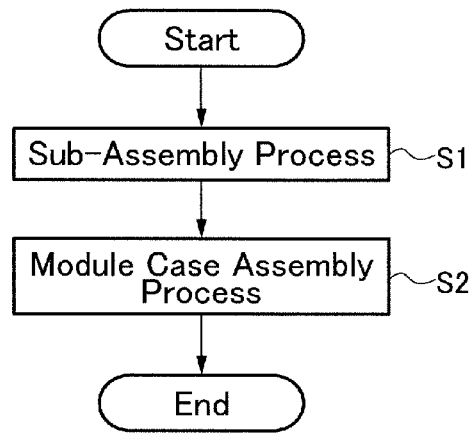
FIG. 13 is a flowchart showing a method of manufacturing a solid oxide fuel cell apparatus according to a first embodiment of the present invention.

Next, referring to FIG. 13, we explain a method of manufacturing a solid oxide fuel cell apparatus according to a first embodiment of the present invention. FIG. 13 is a flowchart showing a method of manufacturing a solid oxide fuel cell apparatus according to a first embodiment of the present invention.

First, in step S1, a sub-assembly process is carried out to affix the reformer 20 and the heat exchange module 21, which includes the heat exchanger 23 and the steam generator 25, to the top plate 8a of the module case 8, which is constituted as a separate body from the side walls 8b of the module case 8. Specifically, the reformer 20 is affixed to the bottom surface of the top plate 8a of the module case 8, and the heat exchange module 21 and heat insulating material 7 are affixed to the top surface of the top plate 8a of the module case 8.

Then, in step S2, a module case assembly process is performed to affix the top plate 8a, to which the reformer 20 and the heat exchange module 21 were affixed in the subassembly process, to the side walls 8b.

Using this type of manufacturing method for a solid oxide fuel cell apparatus according to the present embodiment, with the top plate 8a as a separate body from the side walls 8b the heat exchange module 21 is sub-assembled in advance to the top plate 8a, therefore assembly of the reformer 20 and the heat exchange module 21 to the module case 8 can be easily accomplished.

Note that in the above-described embodiment, the reformer 20 was affixed to the top plate 8a of the module case 8 so as to be slidable in the horizontal direction (see FIG. 8), but in another embodiment the reformer 20 can also be affixed to the top plate 8a of the module case 8 so as not to be movable in the horizontal direction.

Also, in the embodiment above only a single through-hole 20d was placed in the reformer 20 (see FIGS. 5A-C), but in another embodiment two or more through holes similar to the through-hole 20d could be provided in the reformer 20. In that case, the mixed gas supply pipe 62 should be placed within one of the two or more through holes.

Second Embodiment

Next we explain a solid oxide fuel cell apparatus (SOFC) according to a second embodiment of the present invention.

Note that in the explanation below we as appropriate omit a discussion of those constitution and operational effects which are the same as the above described first embodiment, and explain only the constitution and operational effects which differ from the first embodiment. In other words, constitution and operational effects not explained here are the same as in the first embodiment.

Figure 14:
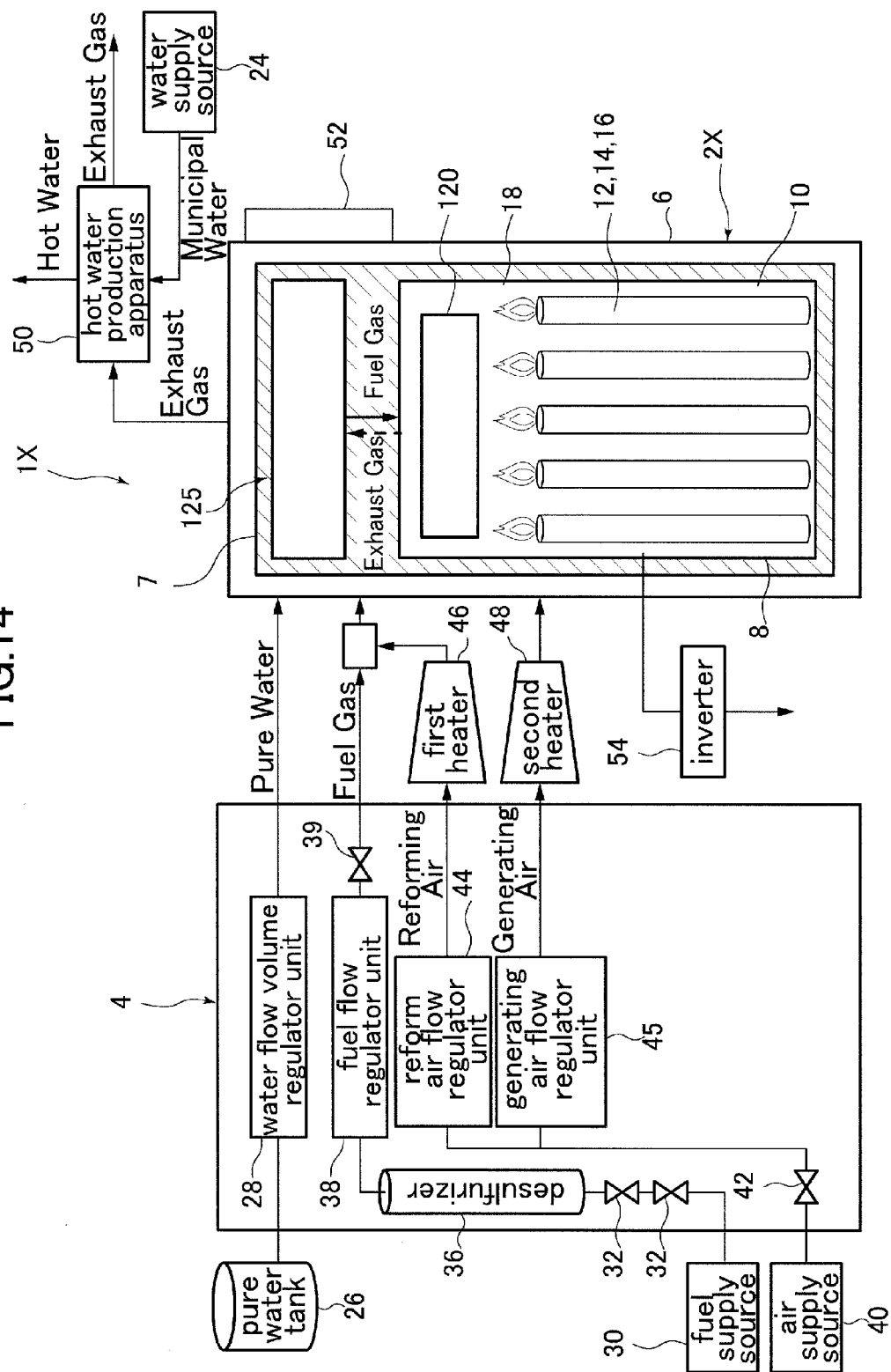
FIG. 14 is an overview diagram showing a solid oxide fuel cell apparatus (SOFC) according to a second embodiment of the present invention.

FIG. 14 is an overview diagram showing a solid oxide fuel cell apparatus according to a second embodiment of the present invention. As shown in FIG. 1, a solid oxide fuel cell apparatus 1X according to a second embodiment comprises a fuel cell module 2X instead of the fuel cell module 2 shown in the first embodiment.

In the fuel cell module 2 according to the above-described first embodiment, a heat exchange module 21 including a heat exchanger 23 and a steam generator 25 is placed within the heat insulating material 7 on the outside of the module case 8, but in the fuel cell module 2X according to the second embodiment, a steam generator 125 is placed within the heat insulating material 7 on the outside of the module case 8. Also, the fuel cell module 2X according to the second embodiment has a reformer which differs from the reformer 20 shown in the first embodiment.

Figure 15:
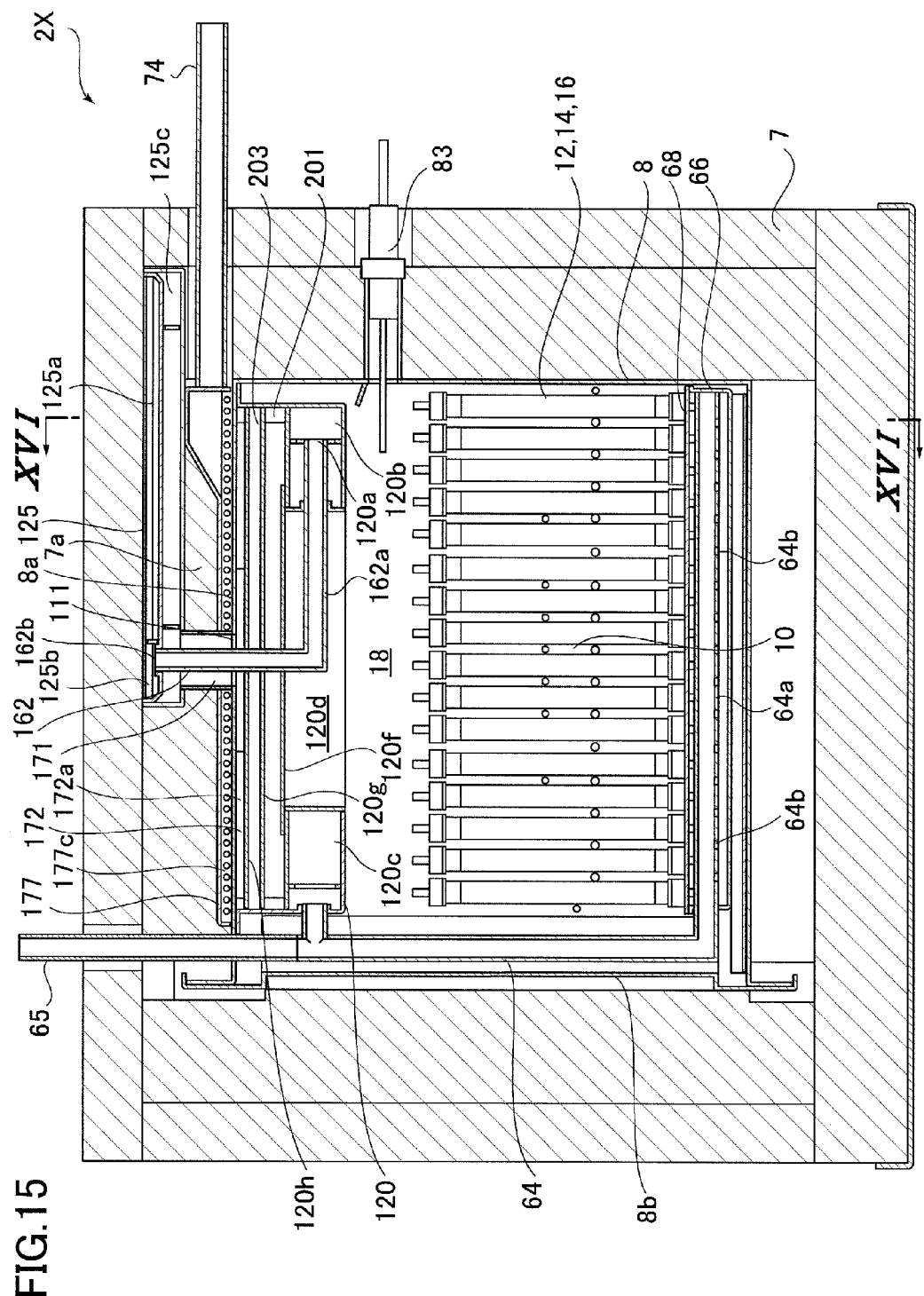
FIG. 15 is a front elevation cross-section showing a fuel-cell module in a solid oxide fuel cell apparatus according to a second embodiment of the present invention.
Figure 16:
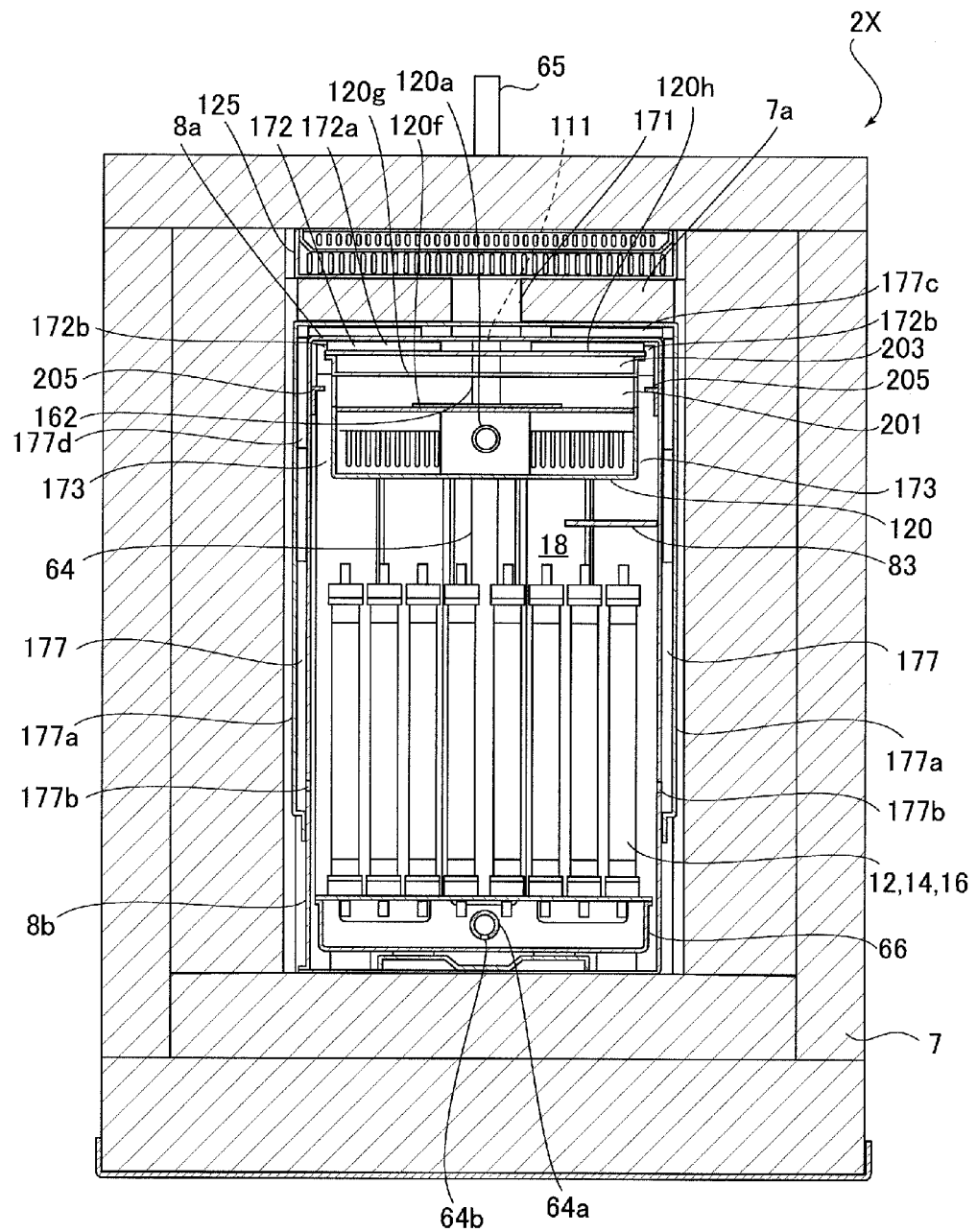
FIG. 16 is a cross-section along line XVI-XVI in FIG. 15.
Figure 17:
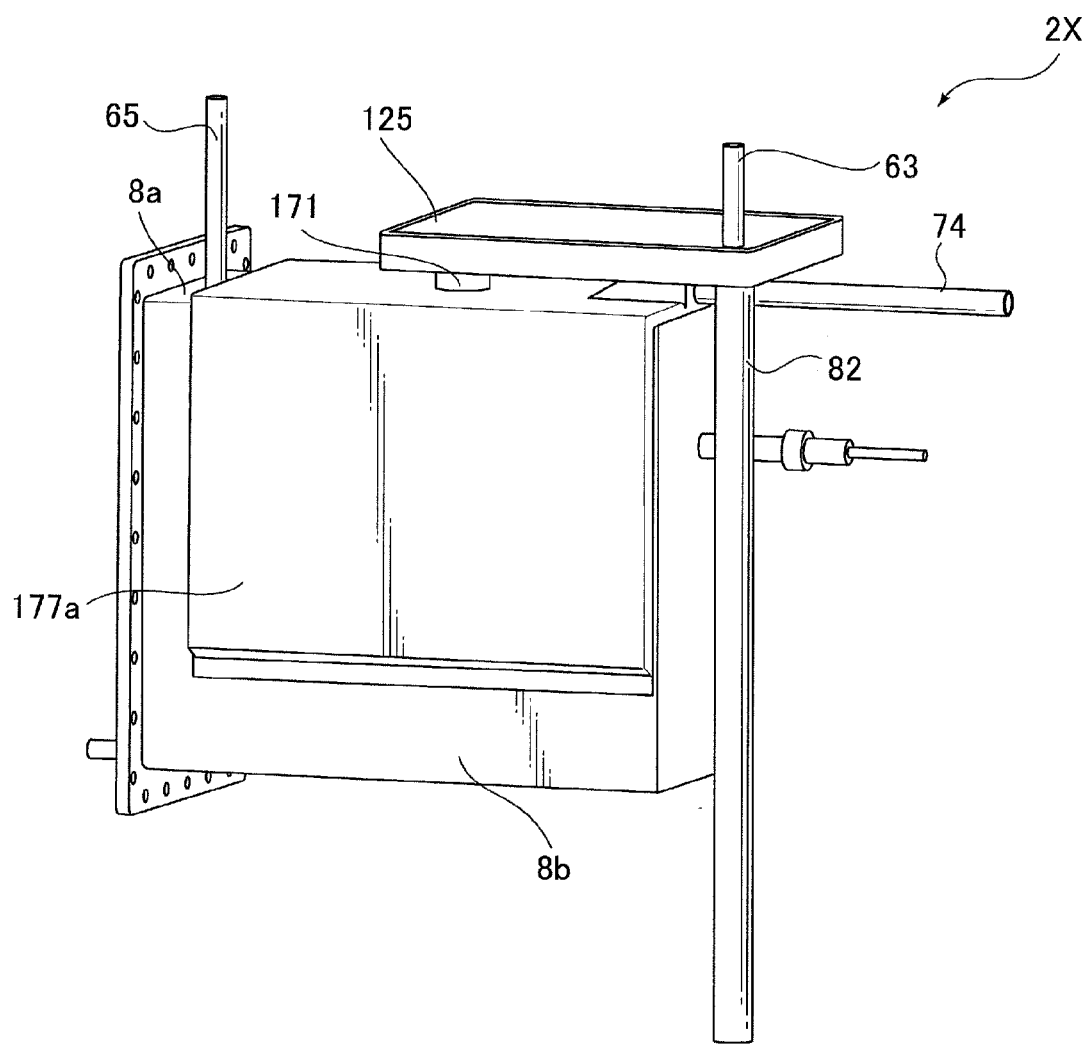
FIG. 17 is a perspective diagram showing a state whereby the insulating material and housing are removed from the fuel cell module in a solid oxide fuel cell apparatus according to a second embodiment of the present invention.

Next, referring to FIGS. 15 through 17, we specifically explain the structure of a fuel cell module in a solid oxide fuel cell apparatus according to a second embodiment of the present invention. FIG. 15 is a front elevation cross-section showing a fuel-cell module in a solid oxide fuel cell apparatus according to a second embodiment of the present invention; FIG. 16 is a cross-section along line XVI-XVI in FIG. 15; FIG. 17 is a perspective diagram showing a fuel cell module with the housing and insulating material removed.

As shown in FIGS. 15 and 16, the fuel cell module 2X primarily has, as described above, a steam generator 125 placed on the inside of the heat insulating material 7 and on the outside of the module case 8, and a fuel cell assembly 12 and reformer 120 placed on the inside of the module case 8.

The steam generator 125 is affixed to the top plate 8a of the module case 8 (see FIG. 17). Also, a part 7a of the heat insulating material 7 is disposed to fill in a gap between the heat exchange module 21 and the module case 8, and this heat insulating material 7 part 7a is also affixed to the top panel 8a of the module case 8 (see FIGS. 15 and 16).

Specifically, in the steam generator 125, fuel supply plumbing 63 for supplying water and raw fuel gas (this may also include reforming air) and an exhaust gas discharge pipe 82 for discharging exhaust gas are connected on one end side thereof in the horizontal direction (see FIG. 17), and a first exhaust passageway 171 joined to an exhaust port 111 formed on the top plate 8a of the module case 8 is connected to the other end side thereof in the horizontal direction (see FIG. 15). This exhaust port 111 is an opening portion for discharging to outside of the module case 8 the exhaust gas produced by the combustion chamber 18 in the module case 8; it is formed in approximately the center portion of the module case 8 top plate 8a, and the steam generator 125 is disposed within the heat insulating material 7 above such an exhaust port 111.

In addition, as shown in FIG. 15, the steam generator 125 has a two layer structure in the vertical direction; an exhaust passageway portion 125c for passing exhaust gas supplied from the aforementioned first exhaust passageway 171 is formed on the bottom layer part thereof, positioned on the module case 8 side. In addition, in the steam generator 125, a steam generating portion 125a for vaporizing water supplied from the fuel supply plumbing 63 to produce steam, and a mixing portion 125b, placed upstream of this steam generating portion 125a in the direction of flow of exhaust gas, for mixing steam produced in the steam generating portion 125a with raw fuel gas supplied from the fuel supply plumbing 63, are formed on the upper layer part positioned at the top portion of this exhaust passageway portion 125c.

For example, the steam generator 125 steam generating portion 125a and mixing portion 125b are formed in spaces in the steam generator 125 partitioned by partitioning plates in which multiple communicating holes are disposed.

In this type of steam generator 125, heat is exchanged between water in the steam generating portion 125a and exhaust gas passing through the exhaust passageway portion 125c; water in the steam generating portion 25a is vaporized by the heat of the exhaust gas and steam is formed.

In addition, heat is exchanged between the mixed gas in the mixing portion 125b and the exhaust gas passing through the exhaust passageway portion 125c, and the temperature of the mixed gas is raised by the heat of the exhaust gas.

Moreover, as shown in FIG. 15, a mixed gas supply pipe 162 for supplying mixed gas from the mixing portion 125b to the reformer 120 in the module case 8, formed so as to pass through the interior of the first exhaust passageway 171, is connected to the mixing portion 125b of the steam generator 125 at the end portion in the steam generator 125 to which the first exhaust passageway 171 is connected. The mixed gas supply pipe 162 is joined at one end to a mixed gas supply port 120a disposed on the reformer 120, then bends 90° after extending in approximately the horizontal direction from this mixed gas supply port 120a, then extends in approximately the vertical direction so as to traverse, in sequence, the interior of the module case 8, the interior of the heat insulating material 7a, and the interior of the exhaust passageway portion 125c on the upstream side in the steam generator 125; the other end of the mixed gas supply pipe 162 is connected to the mixing portion 125b of the steam generator 125. In this case, in the mixed gas supply pipe 162, the end portion 162b connected to the mixing portion 125b of the steam generator 125 is disposed to project above the bottom surface of the steam generating portion 125a and mixing portion 125b of the steam generator 125.

Next, a generating air supply passageway 177 serving as oxidant gas supply passageway is formed on the outside of the module case 8, and more specifically is formed between the outside wall of the module case 8 and the heat insulating material 7 (see FIG. 16). This generating air supply passageway 177 is formed by the space between the top plate 8a and side walls 8b of the module case 8, and the generating air supply case 177a disposed to extend respectively along this top plate 8a and side walls 8b; generating air is supplied from the generating air introduction pipe 74 disposed at a central position on the module case 8 top plate 8a as viewed in front elevation. The generating air supply passageway 177 jets generating air into the generating chamber 10 toward the fuel cell assembly 12 from multiple injection ports 177b disposed on the bottom portion of the module case 8 side walls 8b (see FIG. 16).

Also, flat offset fins 177c, 177d serving as heat exchange promoting members are disposed on the interior of the generating air supply passageway 177 (see FIG. 16). The offset fin 177c is placed in the part of the generating air supply passageway 177 adjacent to the top plate 8a of the module case 8; the offset fin 177d is placed in the part of the generating air supply passageway 177 adjacent to the side walls 8b of the module case 8 and in a position above the fuel cell units 16. Especially when passing the offset fins 177c, 177d, the generating air flowing in the generating air supply passageway 177 exchanges heat with exhaust gas passing through the interior of the module case 8 (specifically, the second and third exhaust passageways 172, 173 disposed inside the module case 8) on the inside the offset fins 177c, 177d, and is thereby heated. From the above, it can be seen that a part of the generating air supply passageway 177 functions as a heat exchanger (air heat exchanger).

Figure 18A:
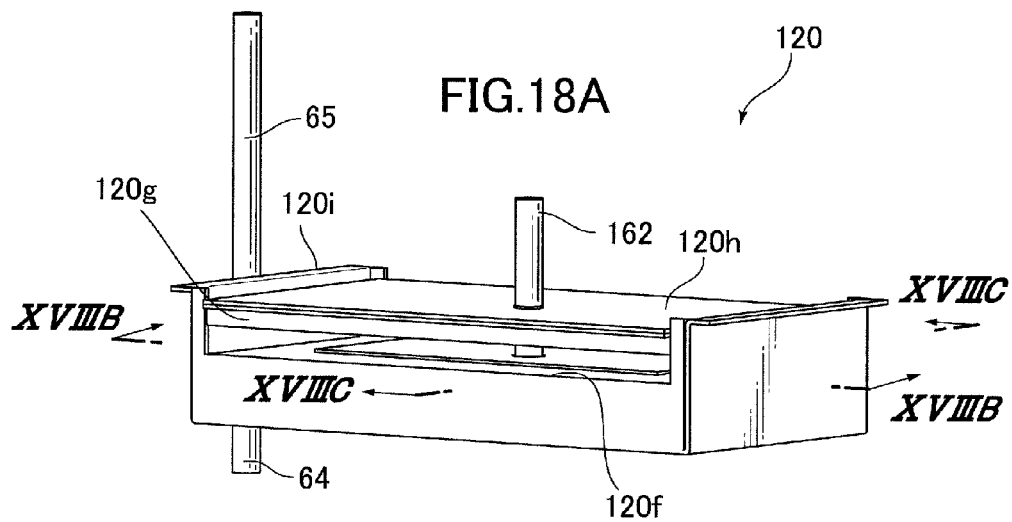
FIG. 18A is a perspective view seen from diagonally above a reformer according to a second embodiment of the present invention.
Figure 18B:
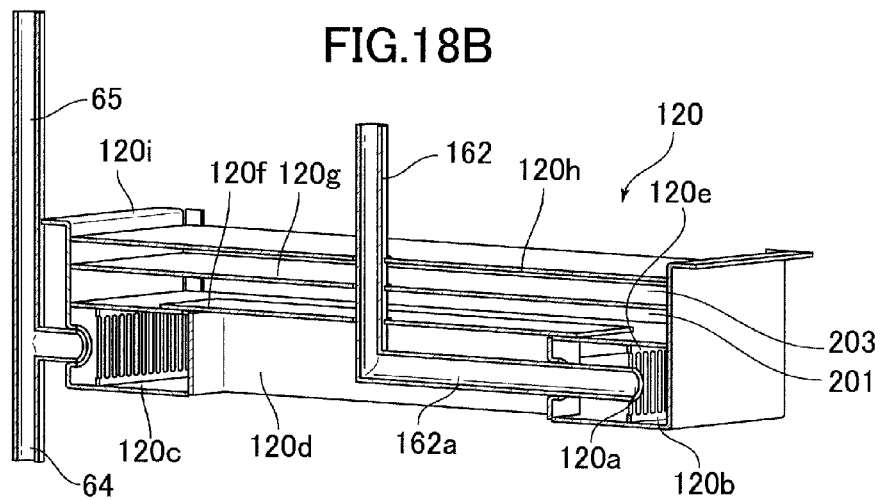
FIG. 18B is a cross-section along line XVIIIB-XVIIIB in FIG. 18A.
Figure 18C:
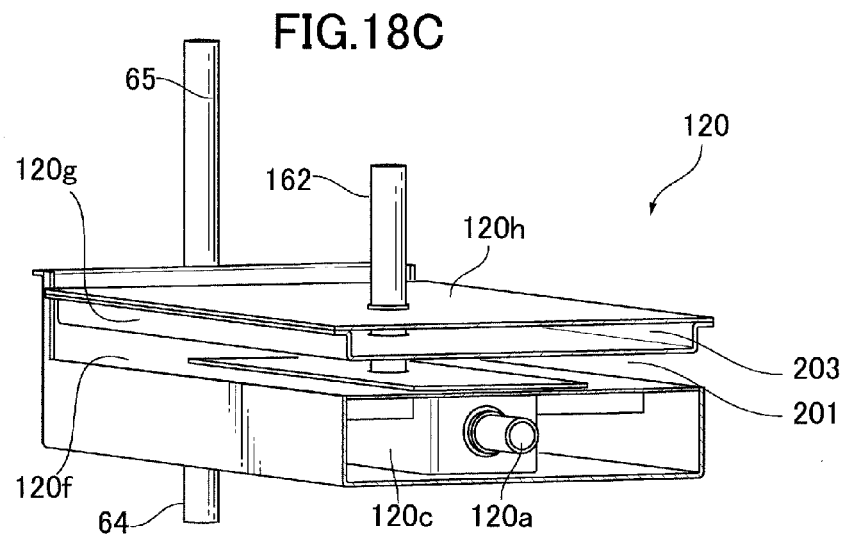
FIG. 18C is a cross-section along line XVIIIC-XVIIIC in FIG. 18A.

Next, referring to FIGS. 18A, 18B, and 18C in addition to FIGS. 15 and 16, we explain a reformer 120 placed inside the module case 8. FIG. 18A is a perspective view seen from diagonally above the reformer 120 according to a second embodiment of the present invention; FIG. 18B is a cross-section along line XVIIIB-XVIIIB in FIG. 18A; FIG. 18C is a cross-section along line XVIIIC-XVIIIC in FIG. 18A. Note that in FIGS. 18A, 18B, and 18C, mixed gas supply pipe 162 and fuel gas supply pipe 64, etc., are also shown in addition to the reformer 120.

The reformer 120 is disposed to extend in the horizontal direction at the top of the combustion chamber 18, and is affixed to the top plate 8a, separated by a predetermined space from the top plate 8a of the module case 8 (see FIG. 15). In the reformer 120, mixed gas from the mixed gas supply pipe 162 flows in from the mixed gas supply port 120a; a preheating portion 120b for preheating this mixed gas, and a reforming portion 120c disposed on the downstream side of the preheating portion 120b in the direction of mixed gas flow is filled with a reforming catalyst (not shown) for reforming mixed gas (i.e., raw fuel gas into which steam is mixed (may also include reforming air)) (see FIG. 18B). Reforming catalysts in which nickel is applied to the surface of aluminum spheres, or ruthenium is applied to the surface of aluminum spheres, are used as appropriate. The reformer 120 preheating portion 120b and reforming portion 120c are formed in spaces in the reformer 120 partitioned by partitioning plates 120e in which multiple communicating holes are formed (see FIG. 18B). Here the reformer 120 is constituted so that mixed gas from the mixed gas supply pipe 162 is jetted from the mixed gas supply port 120a and is expanded in this preheating portion 120b so that the jetting speed drops; jetted mixed gas collides with the wall surface at the downstream end side of the preheating portion 120b and returns, then passes by the partitioning plate 120e to be supplied to the reforming portion 120c (see FIG. 18B).

An upward-indented convex portion 120d is formed in the part of the reformer 120 where the reformer 120c is formed (see FIG. 18B). This convex portion 120d is formed by covering the top portion of a through hole, extending so as to penetrate in the vertical direction, with a plate or the like. A part 162a of the above-described mixed gas supply pipe 162, and more particularly a part 162a extending in the horizontal direction in the mixed gas supply pipe 162, the end portion of which is connected to the mixed gas supply port 120a of the reformer 120, is disposed on this convex portion 120d. This part 162a of the mixed gas supply pipe 162 also functions as a preheating portion for preheating mixed gas passing through its interior using the exhaust gas in the convex portion 120d of the reformer 120 (the mixed gas supply pipe 162 part 162a will be referred to below as the "preheating portion 162a").

In addition, the reformer 120 has a top plate 120f forming the top surface of the preheating portion 120b and the reforming portion 120c, a blocking plate 120g disposed above this top plate 120f with an approximately U-shaped cross-section, open at the top, and a flat plate 120h disposed on the top portion of this blocking plate 120g (see FIGS. 18A-C). The space between the top plate 120f and the blocking plate 120g in the reformer 120 forms an exhaust guiding chamber 201 for guiding and flowing exhaust gas at the top of the preheating portion 120b and reforming portion 120c; the space between the blocking plate 120g and flat plate 120h in the reformer 120 forms a gas pool 203 serving as an insulation layer, where almost no exhaust gas flows (see FIGS. 15 and 16 in addition to FIGS. 18A-C). In addition, a flange portion 120i for affixing the reformer 120 to the top plate 8a on the module case 8 is placed at the top end portion of the reformer 120.

Next, as shown in FIG. 15, a fuel gas supply pipe 64 serving as fuel gas supply passageway for supplying fuel gas produced by reforming in the reforming portion 120c of the reformer 120 is connected to the downstream end of the reformer 120, and a hydrogen removal pipe 65 for hydro-desulfurization is connected to the top portion of this fuel gas supply pipe 64. The fuel gas supply pipe 64 extends downward, then further extends horizontally within the manifold 66 formed at the bottom of the fuel cell assembly 12. Multiple fuel supply holes 64b are formed on the bottom surface of the horizontal portion 64a of fuel gas supply line 64; reformed fuel gas is supplied into the manifold 66 from these fuel supply holes 64b. A lower support plate 68 provided with through holes for supporting the above-described fuel cell stack 14 is attached at the top of manifold 66, and fuel gas in the manifold 66 is supplied into the fuel cell units 16. Also, an ignition device 83 for starting the combustion of fuel gas and air is disposed on the combustion chamber 18.

Next, as shown in FIG. 16, a second exhaust passageway 172 extending the horizontal direction is formed in the module case 8, between the top surface of the reformer 120 (more specifically the flat plate 120h on the reformer 120) and the bottom surface of the top plate 8a of the module case 8. This second exhaust passageway 172 is placed parallel to a part of the generating air supply passageway 177, sandwiching the top plate 8a of the module case 8. Also, a flat offset fin 172a serving as a heat exchange promotion member is placed inside the second exhaust passageway 172. This offset fin 172a is placed in essentially the same location in the horizontal direction as the offset fin 172c placed inside the generating air supply passageway 177. In the part of the generating air supply passageway 177 and the second exhaust passageway 172 where the offset fins 177c, 172a are placed, heat exchange is efficiently performed between generating air flowing in the generating air supply passageway 177 and exhaust gas flowing in the second exhaust passageway 172, so that the temperature of the generating air is raised by the heat of the exhaust gas.

Also, a third exhaust passageway 173 extending in the vertical direction is formed between the outside surface of the reformer 120 and the inside surface of the module case 8. This third exhaust passageway 173 communicates with the second exhaust passageway 172, and exhaust gas flows from the third exhaust passageway 173 to the second exhaust passageway 172. Specifically, exhaust gas flows into the second exhaust passageway 172 from an exhaust gas introduction port 172b positioned at the top end portion of the third exhaust passageway 173 (i.e., at the end portion in the horizontal direction of the second exhaust passageway 172). Exhaust gas flowing into the second exhaust passageway 172 from the exhaust gas introduction port 172b flows out to the first exhaust passageway 171 placed outside the module case 8 through the exhaust port 111 formed on the top plate 8a of the module case 8.

Also, an exhaust guide plate 205 (corresponding to a first exhaust guide portion) for directing exhaust gas so that it flows into the exhaust guiding chamber 201 (the space between the top plate 120f and the blocking plate 120g on the reformer 120) formed in the reformer 120, is placed on the inside surface of the module case 8, midway through the third exhaust passageway 173, and more specifically on the inside surface of the module case 8 above the preheating portion 120b and reforming portion 120c of the reformer 120 and below the exhaust gas introduction port 172b of the second exhaust passageway 172.

Figure 19:
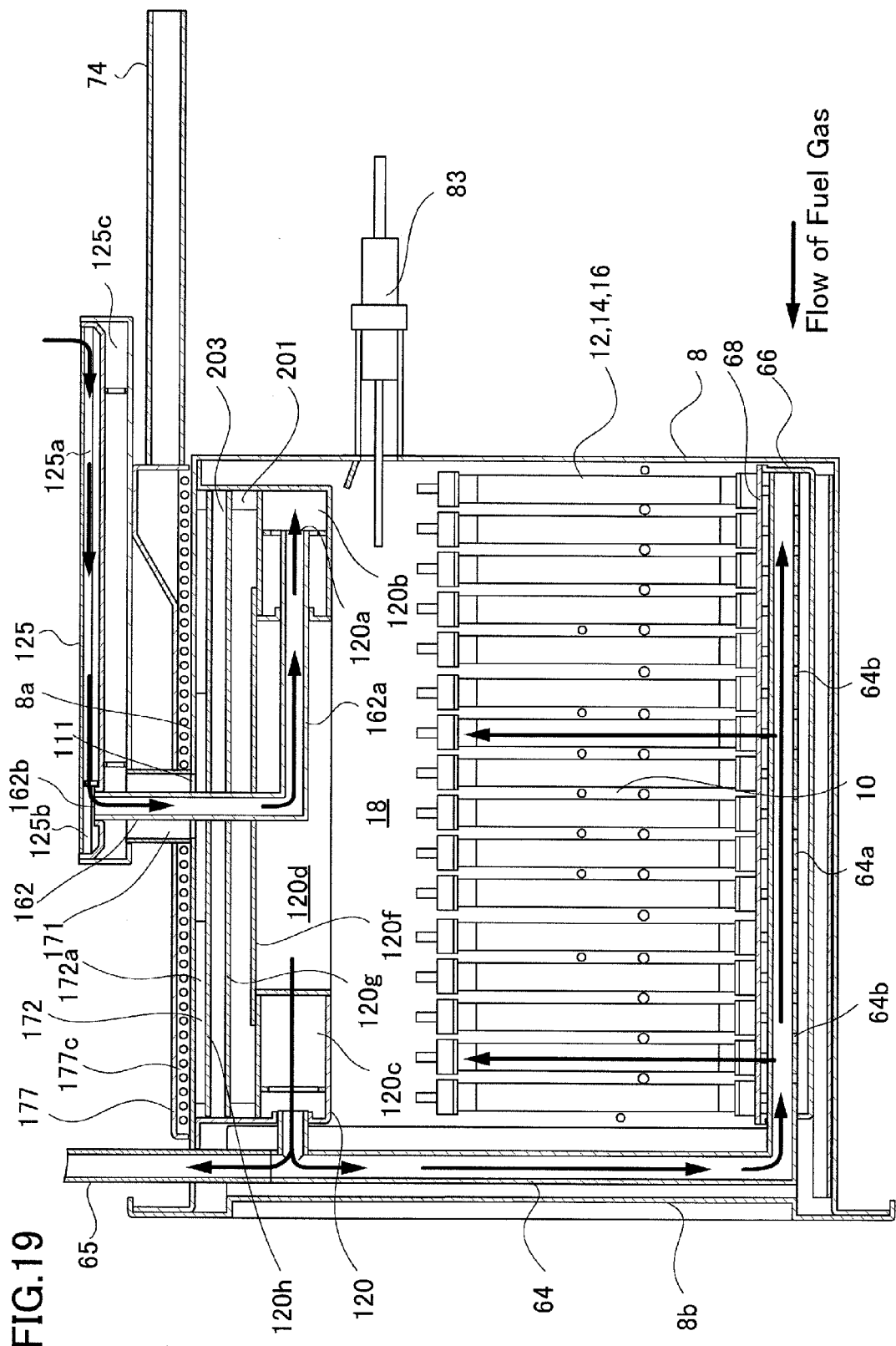
FIG. 19 is a front elevation cross-section showing a fuel cell module for the purpose of explaining the flow of gas in the fuel cell module of a solid oxide fuel cell apparatus according to a second embodiment of the present invention.
Figure 20:
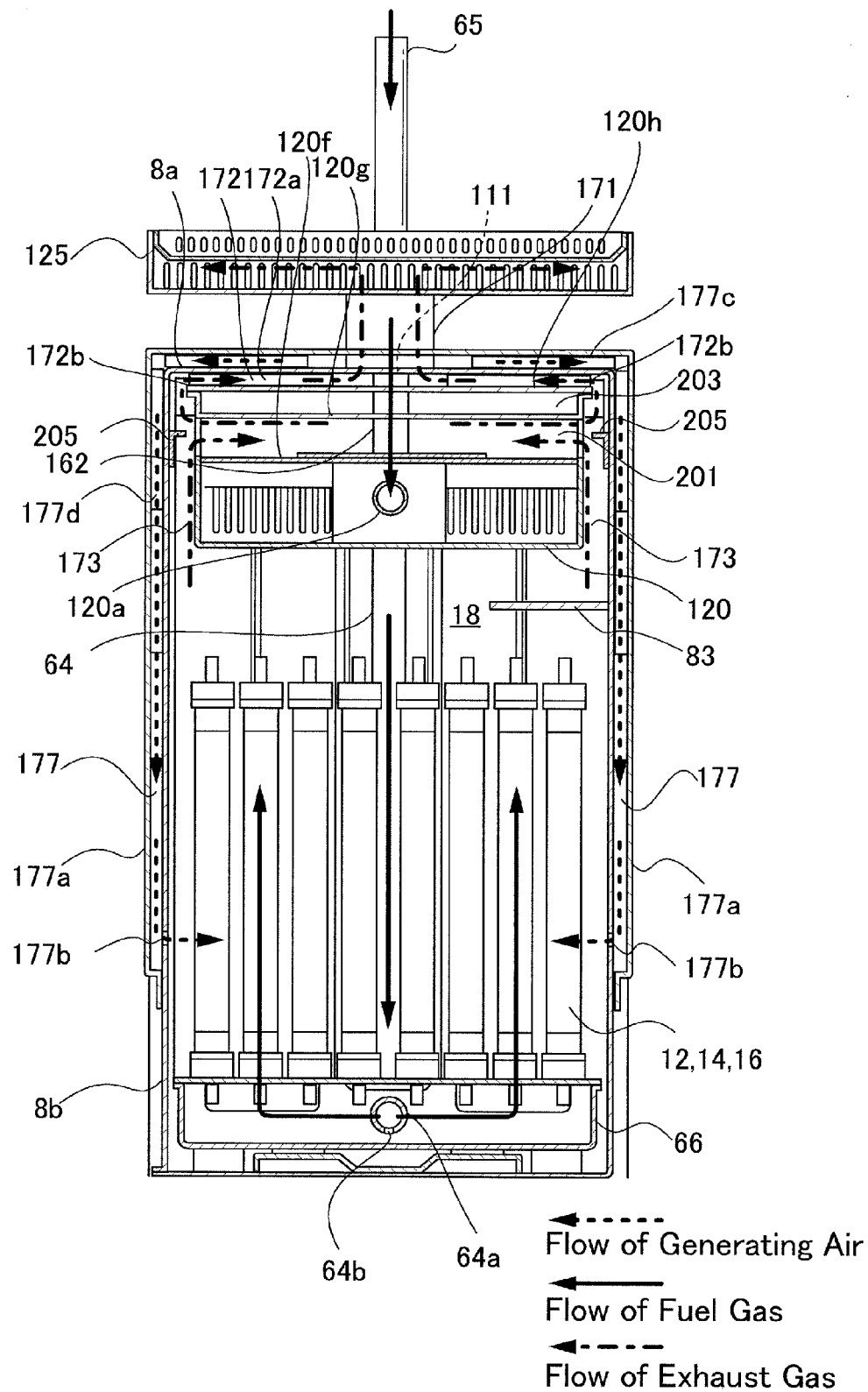
FIG. 20 is a front elevation cross-section along line XVI-XVI in FIG. 15 showing a fuel cell module for the purpose of explaining the flow of gas in the fuel cell module of a solid oxide fuel cell apparatus according to a second embodiment of the present invention.

Next, referring to FIGS. 19 and 20, we explain the flow of gas inside the fuel cell module in a solid oxide fuel cell apparatus according to a second embodiment of the present invention. FIG. 19, like FIG. 15, is a cross-section showing a fuel cell module in a solid oxide fuel cell apparatus according to a second embodiment of the present invention; FIG. 20, like FIG. 16, is a cross-section along line XVI-XVI in FIG. 15. FIGS. 19 and 20 again append arrows showing the flow of gas in FIG. 15 and FIG. 16; for ease of explanation the figures are shown with the heat insulating material 7 removed. Note that in FIG. 19 only the flow of fuel gas (also including water, steam, and raw fuel gas) is shown.

As shown in FIG. 19, water and raw fuel gas (fuel gas) are supplied into the steam generator 125 from fuel supply plumbing 63 (see FIG. 17) connected at one end in the horizontal direction to the steam generator 125; more specifically, they are supplied into the steam generating portion 125a disposed on a top layer of the steam generator 125. Water supply to the steam generating portion 125a of the steam generator 125 is subjected to heat exchange with the exhaust gas flowing in the exhaust passageway portion 125c disposed on a bottom layer of the steam generator 125, where it is heated by the heat of the exhaust gas and vaporizes into steam.

As shown in FIG. 19, water and raw fuel gas (fuel gas) are supplied into the steam generator 125 from fuel supply plumbing 63 (see FIG. 17) connected at one end in the horizontal direction to the steam generator 125; more specifically, they are supplied into the steam generating portion 125a disposed on a top layer of the steam generator 125.

Mixed gas (fuel gas), in which steam and raw fuel gas are mixed in the mixing portion 125b, flows through the mixed gas supply pipe 162, which is connected to the side opposite to the side on which the fuel supply plumbing 63 is connected in the steam generator 125, and extends so as to traverse the exhaust passageway portion 125c of the steam generator 125, the heat insulating material 7a, and interior of the module case 8, so that it flows into the reformer 120 in the module case 8. In this case, the mixed gas exchanges heat with the exhaust gas flowing in the exhaust passageway portion 125c at the bottom of the mixing portion 125b, with exhaust gas flowing in the area around the part of the mixed gas supply pipe 162 positioned inside the exhaust passageway portion 125c and the first exhaust passageway 171, and with exhaust gas flowing around the part of the mixed gas supply pipe 162 positioned in the module case 8. In particular, inside the module case 8, within the preheating portion 162a of the mixed gas supply pipe 162 positioned inside the convex portion 120d of the reformer 120, efficient heat exchange is carried out between mixed gas flowing in the preheating portion 162a and exhaust gas in the convex portion 120d of the reformer 120.

Thereafter, mixed gas supplied from the mixed gas supply pipe 162 to the reformer 120 flows through the mixed gas supply port 120a in the reformer 120, into the preheating portion 120b disposed on one end side in the horizontal direction of the reformer 120, and mixed gas flowing into the preheating portion 120b is heated by the exhaust gas flowing in the area around the preheating portion 120b. In this case, the preheating portion 120b of the reformer 120 has a structure which is more expanded than the mixed gas supply pipe 162, therefore in the preheating portion 120b of the reformer 120 mixed gas is jetted from the mixed gas supply pipe 162, and mixed gas jetted in this manner is expanded in the preheating portion 120b so that the jetting speed is reduced. The mixed gas then collides with the wall surface at the downstream end of the preheating portion 120b and returns, then passes by the partitioning plate 120e inside the reformer 120 (see FIG. 18B), flows into the reforming portion 120c filled with reforming catalyst, and is reformed in this reforming portion 120c to become fuel gas. Fuel gas produced in this way flows through the fuel gas supply pipe 64, connected on the downstream side of the reforming portion 120c of the reformer 120, and through the hydrogen removal pipe 65 for hydro-desulfurization, connected to the top of this fuel gas supply pipe 64. Fuel gas is then supplied into the manifold 66 from the fuel gas supply pipe 64 disposed on the horizontal portion 64a of the fuel gas supply pipe 64, and fuel gas inside the manifold 66 is supplied into each of the fuel cell units 16.

On the other hand, as shown in FIG. 20, generating air supplied from the generating air introduction pipe 74 (see FIGS. 17 and 19) flows through the generating air supply passageway 177 formed by the space between the module case 8 top plate 8a and side walls 8b, and the generating air supply case 177a disposed to extend along the top plate 8a and side walls 8b, respectively. At this point, when passing the offset fins 177c, 177d, the generating air flowing in the generating air supply passageway 177 efficiently exchanges heat with exhaust gas passing through the interior of the module case 8 on the inside the offset fins 177c, 177d, and is thereby heated. In particular, because an offset fin 172a is disposed inside the second exhaust passageway 172 corresponding to the offset fin 177c of the generating air supply passageway 177, generating air exchanges heat more efficiently with exhaust gas via the offset fin 177c in the second exhaust passageway 172 and the offset fin 172a in the second exhaust passageway 172. Thereafter, generating air is jetted into the generating chamber 10 toward the fuel cell assembly 12 from the multiple injection ports 77b disposed on the bottom portion of the side walls 8b of the module case 8.

On the other hand, fuel gas not used for electrical generation and remaining in the fuel cell units 16 is combusted in the combustion chamber 18 within the module case 8 to become exhaust gas (combustion gas), and rises inside the module case 8. Specifically, exhaust gas produced by combustion first passes through a third exhaust passageway 173 formed between the outside surface of the reformer 120 and the inside surface of the module case 8. When this happens, exhaust gas is directed by an exhaust guide plate 205 disposed on the inside surface of the module case 8 to an exhaust guiding chamber 201 (a space between the reformer 120 top plate 120f and blocking plate 120g) formed in the reformer 120. Exhaust gas which has traveled through the exhaust guiding chamber 201 (including exhaust gas flowing into the exhaust guiding chamber 201 and exhaust gas not flowing into the exhaust guiding chamber 201) rises without flowing into the gas pool 203 (the space between the blocking plate 120g and the flat plate 120h of the reformer 120) at the top of the exhaust guiding chamber 201, and flows from the exhaust gas introduction port 172b into the second exhaust passageway 172.

Thereafter, exhaust gas flows through the second exhaust passageway 172 in the horizontal direction, and flows out from the exhaust port 111 formed on the top plate 8a of the module case 8. When exhaust gas is flowing in the horizontal direction through the second exhaust passageway 172, mediated by the offset fin 172a disposed inside the second exhaust passageway 172 and by the offset fin 177c disposed inside the generating air supply passageway 177 and corresponding to this offset fin 172a, generating air flowing through the generating air supply passageway 177 and exhaust gas flowing through the second exhaust passageway 172 efficiently exchange heat, and the temperature of the generating error is raised by the heat of the exhaust gas.

Exhaust gas flowing out from the exhaust port 111, after passing through the first exhaust passageway 171 placed on the outside of the module case 8, passes through the exhaust passageway portion 125c of the steam generator 125 connected to the first exhaust passageway 171, and is discharged from the exhaust gas discharge pipe 82 (see FIG. 17) connected on the downstream side of the steam generator 125. The exhaust gas, when flowing through the exhaust passageway portion 125c of the steam generator 125, exchanges heat with mixed gas in the mixing portion 125b of the steam generator 125 and with water in the steam generating portion 125a of the steam generator 125.

Next we explain the operational effect of a solid oxide fuel cell apparatus according to a second embodiment of the present invention.

In the present embodiment the generating air supply passageway 177 and the second exhaust passageway 172 are disposed in parallel, sandwiching the module case 8, and more specifically forming the generating air supply passageway 177 on the outside of the module case 8 and the second exhaust passageway 172 inside the module case 8 (see FIG. 16), thereby enabling the size and cost of the fuel cell module 2X to be reduced. We shall now explain this more specifically. In conventional solid oxide fuel cell apparatuses, exhaust gas was discharged from an exhaust port toward the reformer above, and an air heat exchange was performed in the process of flowing the exhaust gas downward from above. In such circumstances, exhaust gas greatly lowered in temperature by air flows to the bottom side of the individual fuel cell causing the bottom side of the individual fuel cell to drop in temperature (a vertical temperature gradient is produced in the fuel cell), and the possibility of fuel cell degradation arises.

To prevent this, in conventional solid oxide fuel cell apparatuses a certain distance of separation was imposed between the passageways through which exhaust gas and generating air flow and the fuel cells, or heat insulating material was installed in a partial manner between the passageways through which exhaust gas and generating air flow and the fuel cells. This increased the size of the module case.

Moreover, the heat reflective characteristics changed in places where the heat insulating material was partially placed, adversely affecting the fuel cells.

In contrast, in the present embodiment the second exhaust passageway 172 is disposed above the fuel cell assembly 12 in the module case 8, and an air heat exchange is performed using this second exhaust passageway 172; i.e., the air heat exchange is performed at a position within the module case 8 above the fuel cell assembly 12, and exhaust gas is not permitted to flow down the side of the fuel cell assembly 12, therefore the creation of a vertical temperature gradient in the fuel cell assembly 12 can be constrained. In this case, because in the present embodiment there is no need to impose a certain distance between the passageways through which exhaust gas and generating air flow and the fuel cell assembly 12, or to place the heat insulating material between the passageways through which exhaust gas and generating air flow and the fuel cell assembly 12, as was the case in the conventional art described above, effects on the fuel cell assembly 12 can be constrained without increasing the size or cost of the fuel cell module 2X.

For such reasons, using the present embodiment the fuel cell module 2X size and cost can be reduced. Specifically, in the present invention it is not necessary to separate the fuel cell assembly 12 from the module case 8 in order to account for thermal effects on the fuel cell assembly 12, and the fuel cell assembly 12 and the module case 8 may be disposed in proximity to one another, therefore the fuel cell module 2X may be made compact.

In the present embodiment the air heat exchange is performed using only the generating air supply passageway 177 and the second exhaust passageway 172 at the top of the fuel cell assembly 12, so there is a tendency for the heat exchange distance to be shortened (i.e., there is a tendency for the heat exchange surface area to be reduced), making it difficult to raise the temperature of the generating air. In order to handle this in the present embodiment, the steam generator 125 is placed on the outside of the module case 8 so as to maintain a high temperature of the exhaust gas inside the module case 8 performing the air heat exchange (in this case, the air heat exchange is naturally performed using exhaust gas prior to the heat exchange in the steam generator 125). By so doing, a high temperature of the exhaust gas inside the module case 8 where the air heat exchange is performed can be maintained, and the generating air temperature can be sufficiently raised without shortening the heat exchange distance.

Also, in the present invention not only is a heat exchange performed naturally between the chamber heat of the module case 8 and the generating air, but a second exhaust passageway 172 is formed above the fuel cell assembly 12, and an air heat exchange is also actively performed in an environment which does not affect the fuel cell assembly 12, therefore a stable air heat exchange can be reliably perform without being affected by fluid motion of the exhaust, etc.

Moreover, in the present invention, by the above constitution, the temperature of generating error can be raised using exhaust gas with a low heat (i.e., thermal autonomy is easily achieved), and a small amount of generating air is sufficient to raise the temperature of the system.

Also, in the present embodiment the offset fins 177c, 177d serving as heat exchange promotion members are placed at a position inside the generating air supply passageway 177 above the fuel cell assembly 12 (see FIG. 16), therefore the performance when raising the generating air temperature using exhaust gas can be raised. By so doing, the generating air supply passageway 177 does pass by the side of the fuel cell assembly 12 (see FIG. 16), but the generating air temperature can be sufficiently raised before the generating air flows over the side of the fuel cell assembly 12, and the bottom side of the fuel cell assembly 12 can be constrained from dropping to a low temperature using a simple structure.

Also, in the present embodiment a third exhaust passageway 173 is further formed between the outside surface of the reformer 120 and the inside surface of the module case 8, therefore heat can be exchanged not only between exhaust gas and generating air, but also with the reformer 120, so the temperature of both the reformer 120 and the generating air can be raised with a simple structure.

Also, in the present embodiment, by means of a blocking plate 120g disposed between the reformer 120 reforming portion 120c and the module case 8 top plate 8a, a gas pool 203 is formed so that almost no flow of exhaust gas occurs above the blocking plate 120g, therefore robbing of exhaust gas heat by the module case 8 top plate 8a, etc., can be constrained before exhaust gas flows in from the exhaust gas introduction port 172b in the second exhaust passageway 172. Thus a high temperature of exhaust gas introduced into the second exhaust passageway 172 can be maintained, i.e., high-temperature exhaust gas can be introduced into the second exhaust passageway 172, and a high temperature-raising performance relative to generating air can be achieved even with a short heat exchange distance.

In addition, in the present invention the exhaust guiding chamber 201 is formed under the blocking plate 120g and over the reforming portion 120c, therefore the reforming portion 120c can be heated from above by exhaust gas introduced into this exhaust guiding chamber 201. In this case, the blocking plate 120g above the reforming portion 120c functions as a reflecting plate, therefore heat radiated by the blocking plate 120g can be even further imparted to the reforming portion 120c, and the temperature of the reforming portion 120c can be effectively raised. In addition, the gas pool 203 above the blocking plate 120g functions as an insulating layer, therefore the temperature of the reforming portion 120c can be maintained appropriately.

Also, in the present embodiment an exhaust guide plate 205 is provided for directing exhaust gas passing through the third exhaust passageway 173 toward the exhaust guiding chamber 201, therefore immediate inflow of exhaust gas from the third exhaust passageway 173 to the second exhaust passageway 172 can be constrained, and exhaust gas in transit through the third exhaust passageway 173 can be appropriately flowed to the top surface of the reforming portion 120c, so that the reforming portion 120c can be effectively heated by this exhaust gas from above. In this case, a blocking plate 120g is disposed on the top portion of the exhaust guiding chamber 201, so no flowing of exhaust gas to the top plate 8a side occurs.

Next we explain a variant example of a second embodiment of the present invention.

Figure 21:
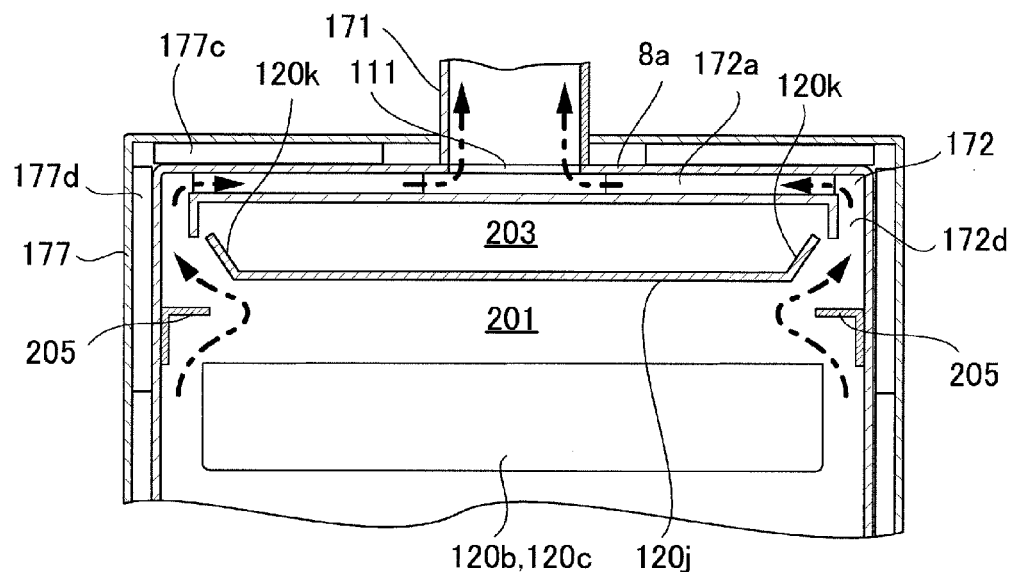
FIG. 21 is a summary cross-section showing part of a fuel cell module to which a blocking plate is applied, according to a variant example of a second embodiment of the present invention.

Referring to FIG. 21, we explain a blocking plate according to a variant example of the second embodiment of the present invention. FIG. 21 is summary cross-section showing part of a fuel cell module to which a blocking plate is applied, according to a variant example of a second embodiment of the present invention.

As shown in FIG. 21, a blocking plate 120j according to this variant example has a sloped portion 120k, which is placed in a similar position to the above-described blocking plate 120g (see FIG. 16 and FIGS. 18A-C), but the edge portion of which is sloped in the vertical direction. This blocking plate 120j and sloped portion 120k correspond to a second exhaust guide portion, and as shown by the arrow in FIG. 21, they direct the exhaust gas to flow into the exhaust gas introduction port 172b on the second exhaust passageway 172. In this variant example, the second exhaust passageway 172 extends not only in the horizontal direction but also extends downward at the end of its horizontal extension, and the exhaust gas introduction port 172b is positioned below the horizontal portion of this second exhaust passageway 172. Also, in this variant example as well, the space below the blocking plate 120j and above the reforming portion 120c forms an exhaust guiding chamber 201, and the space above the blocking plate 120j and below the second exhaust passageway 172 forms a gas pool 203.

In this variant example, exhaust gas is effectively guided by the sloped portion 120k placed on the blocking plate 120j so that the exhaust gas flows from the exhaust gas introduction port 172b to the second exhaust passageway 172. For this reason, exhaust gas maintained at a high temperature can be introduced into the second exhaust passageway 172, and the heat exchange characteristics between exhaust gas in the second exhaust passageway 172 and generating air in the generating air supply passageway 177 can be improved. In addition, no separate member for guiding the exhaust gas is used, therefore a reduction in the size of the fuel cell module 2X can be achieved.

Figure 22:
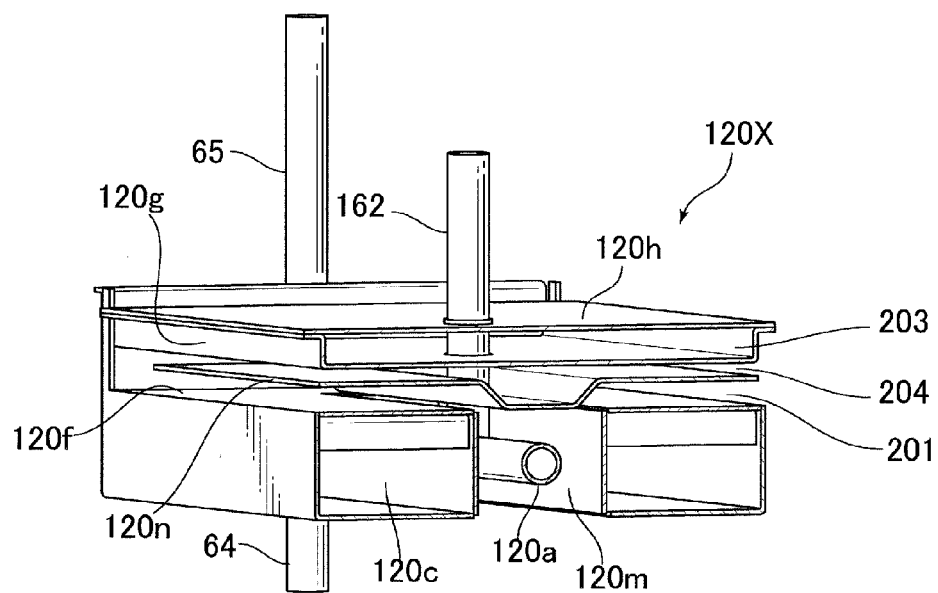
FIG. 22 is a cross-section perspective view of a reformer according to a variant example of a second embodiment of the present invention.

Next, referring to FIG. 22, we explain a reformer according to a variant example of the second embodiment of the present invention.

FIG. 22 is a cross-section perspective view of a reformer according to a variant example of a second embodiment of the present invention. FIG. 22 is a cross-section along the same cut line as line XVIIIC-XVIIIC in FIG. 18A.

As shown in FIG. 22, in a reformer 120X according to the present variant example, a through-hole 120m, through which exhaust gas produced in the lower combustion chamber 18 passes, extending so as to vertically penetrate said reformer 120X is formed on the part corresponding to the convex portion 120d of the reforming portion 120c (see FIGS. 18A-C) (more specifically, the part in which the reforming portion 120c is formed). A mixed gas supply pipe 162 preheating portion 162 is disposed on this through-hole 120m. In a reformer 120X with such a through-hole 120m, exhaust gas passes not only between the outside surfaces of the reformer 120 preheating portion 120b and reforming portion 120c and the inside surface of the module case 8, but also through the through-hole 120m in the reformer 120X, flowing from bottom to top.

Also, in the reformer 120X of the present variant example, a blocking plate 120n, downwardly indented in the middle portion (the part facing the through-hole 120m), is further provided between the top plate 120f and the blocking plate 120g. When such a blocking plate 120n is further provided, the space between the blocking plate 120n and the top plate 120f forms an exhaust guiding chamber 201, the space between the blocking plate 120n and the blocking plate 120g forms a gas pool 204, and the space between the blocking plate 120g and the flat plate 120h forms a gas pool 203. In other words, two gas pools 203, 204, i.e., two insulating layers, are formed.

Note that in the variant example shown in FIG. 22, only a single through-hole 120m was disposed on the reformer 120X, but in another embodiment two or more through holes similar to the through-hole 120m could be provided on the reformer 120X. In that case, the mixed gas supply pipe 162 should be placed within one of the two or more through holes. Also, in the present embodiment it is also acceptable to cover the top part of the through-hole 120m on the reformer 120X with a plate or the like, and not form a concave portion.

What is claimed is:

1. A solid oxide fuel cell apparatus for generating electricity by the reaction of fuel gas and oxidant gas, comprising:

a first chamber and a second chamber, provided above the first chamber, separately and independently defined from each other by insulating material, wherein the first and second chambers are separated by the insulating material;

multiple fuel cells provided in the first chamber and serially connected to each other;

an oxidant gas supply passageway for supplying oxidant gas to the multiple fuel cells;

a fuel gas supply passageway for supplying fuel gas to the multiple fuel cells;

a reformer provided in the first chamber above the multiple fuel cells and configured to reform raw fuel gas with steam and supply reformed fuel gas to the fuel gas supply passageway;

a combustion space defined in the first chamber between the multiple fuel cells and the reformer, wherein the reformed fuel gas left unused for electricity generation by the multiple fuel cells is combusted in the combustion space to produce high temperature exhaust gas, the exhaust gas flowing through the reformer to heat the reformer;

an exhaust passageway running from inside of the first chamber into inside of the second chamber to guide the exhaust gas, after it heats the reformer, from the first chamber into inside of the second chamber;

a heat exchanger provided in either the first chamber or the second chamber and configured to receive a flow of oxidant gas into the heat exchanger, the exhaust passageway being arranged to run through the heat exchanger so that heat from the exhaust gas flowing through the exhaust passageway heats the oxidant gas in the heat exchanger, from which the heated oxidant gas flows to the oxidant gas supply passageway; and a steam generator provided in the second chamber and configured to receive a flow of water into the steam generator, the exhaust passageway being arranged to run through the steam generator so that heat from the exhaust gas flowing through the exhaust passageway heats the water to generate steam from the water in the steam generator, from which the steam flows into the reformer, wherein the heat exchanger is positioned upstream of the steam generator along flow of the exhaust gas through the exhaust passageway so that the exhaust gas flowing through the exhaust passageway heats the oxidant gas in the heat exchanger and subsequently heats the water in the steam generator.

2. The solid oxide fuel cell apparatus according to claim 1, wherein the exhaust passageway comprises an exhaust port configured to flow the exhaust gas from inside of the first chamber into inside of the second chamber, the exhaust passageway running from inside of the first chamber through the exhaust port into inside of the second chamber, wherein the steam generator comprises a steam generating portion configured to generate the steam by vaporizing the water and a mixing portion configured to mix the steam with raw fuel gas to produce a mixed gas; and wherein the solid oxide fuel cell apparatus further comprises a mixed gas supply pipe configured to supply the mixed gas from the steam generator to the reformer, wherein the mixed gas supply pipe extends through the exhaust passageway running in the steam generator.

3. The solid oxide fuel cell apparatus according to claim 2, wherein the mixed gas supply pipe extends in the steam generator an upstream side of the exhaust passageway in the steam generator.

4. The solid oxide fuel cell apparatus according to claim 3, wherein the heat exchanger is provided in the second chamber, wherein the heat exchanger and the steam generator are disposed side by side horizontally, and wherein the exhaust passageway runs straight through the heat exchanger and the steam generator in a horizontal direction.

5. The solid oxide fuel cell apparatus according to claim 4, wherein the heat exchanger and the steam generator are integrally formed to form a heat exchange module, wherein the heat exchange module comprises a case which is open at a top thereof, and approximately in a U-shape in a horizontal cross-section, the case extending in the horizontal direction, wherein the case includes the exhaust passageway running through both the heat exchanger and the steam generator, and wherein the heat exchanger and the steam generator are integrally formed to close the top of the case.

6. The solid oxide fuel cell apparatus according to claim 1, wherein the heat exchanger is disposed in the first chamber above the reformer, wherein the solid oxide fuel cell apparatus further comprises a mixed gas supply pipe extending vertically from inside of the second chamber into inside of the first chamber through the heat insulating material provided between the first and second chambers and connecting the steam generator and the reformer to supply the steam from the steam generator to the reformer; and wherein the steam generator is disposed at a position above the reformer on an intake side of the reformer where the steam flows from the gas supply pipe in the reformer.

7. The solid oxide fuel cell apparatus according to claim 1, wherein the exhaust passageway comprises an exhaust port configured to flow the exhaust gas from inside of the first chamber into inside of the second chamber, wherein the reformer comprises a mixed gas supply port through which the steam from the steam generator flows into the reformer, wherein the exhaust port and the mixed gas supply port are arranged, respectively, at horizontal ends of the reformer, and wherein the heat exchanger is disposed above the exhaust port and the steam generator is disposed above the mixed gas supply port.

8. The solid oxide fuel cell apparatus according to claim 7, wherein the steam generator comprises a steam generating portion configured to generate the steam by vaporizing the water, and a mixing portion configured to mix the steam and raw fuel gas to produce mixed gas, wherein the mixing portion is arranged upstream of the steam generating portion along flow of the exhaust gas through the exhaust passageway, and placed closer to the heat exchanger than the steam generating portion, and wherein the solid oxide fuel cell apparatus comprises a mixed gas supply pipe running vertically through the insulating material from inside of the second chamber into inside of the first chamber and communicating between the mixing portion of the steam generator and the mixed gas supply port of the reformer so that the mixed gas supply pipe flows the mixed gas from the mixing portion of the steam generator into the mixed gas supply port of the reformer.

9. The solid oxide fuel cell apparatus according to claim 8, wherein the mixed gas supply pipe has an upstream end extending in the steam generator into mixing portion of the steam generator.

10. The solid oxide fuel cell apparatus according to claim 8, wherein the mixed gas supply pipe comprises a thermal expansion absorption portion configured to absorb a difference in thermal expansion between sections of the mixed gas supply pipe located, respectively, inside of the first chamber and inside of the second chamber.

11. The solid oxide fuel cell apparatus according to claim 8, wherein the reformer comprises a through-hole extending vertically through the reformer for allowing the exhaust gas to pass through the through-hole from below to above the reformer, and wherein the gas supply pipe runs from inside of the through-hole into the gas supply port of the reformer.

12. The solid oxide fuel cell apparatus according to claim 1, wherein the heat exchanger is disposed in the first chamber above the reformer, wherein the steam generator comprises a steam generating portion configured to generate the steam by vaporizing the water, and a mixing portion configured to mix the steam with raw fuel gas to produced mixed gas, wherein the solid oxide fuel cell apparatus further comprises a mixed gas supply pipe extending vertically from inside of the second chamber into the first chamber through the heat insulating material provided between the first and second chambers and communicating between the mixing portion of the steam generator and the reformer so that the mixed gas flows from the mixing portion of the steam generator to the reformer through the mixed gas supply pipe, and wherein the reformer comprises a preheating portion defined therein and configured to preheat the mixed gas supplied from the mixed gas supply pipe into the reformer, and a reforming portion filled with reforming catalyst and defined in the reformer downstream of the preheating portion along flow of the mixed gas in the reformer.

13. The solid oxide fuel cell apparatus according to claim 12,
- wherein the preheating portion of the reformer is positioned directly above the combustion space to receive heat from the exhaust gas generated in the combustion space; and
- wherein the solid oxide fuel cell apparatus further comprises an exhaust gas directing portion configured to direct the exhaust gas from the combustion space to the preheating portion of the reformer.

14. The solid oxide fuel cell apparatus according to claim 13,
- wherein the exhaust passageway comprises an exhaust port located above the reformer and configured to flow the exhaust gas from inside of the first chamber into inside of the second chamber, and
- wherein the exhaust directing portion is configured to direct the exhaust gas to the preheating portion of the reformer so that the exhaust gas returns after hitting the preheating portion and then flows in the exhaust port.

15. The solid oxide fuel cell apparatus according to claim 14, wherein the mixed gas supply pipe comprises a section thereof in which the mixed gas is preheated in the mixed gas supply pipe.

* * * * *